United States Patent
Yi

(10) Patent No.: US 10,750,330 B2
(45) Date of Patent: *Aug. 18, 2020

(54) METHOD AND APPARATUS FOR IMPLEMENTING RESENDING OF SHORT MESSAGE

(71) Applicant: Huawei Device Co., Ltd., Dongguan (CN)

(72) Inventor: Qiang Yi, Beijing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,774

(22) Filed: Aug. 18, 2017

(65) Prior Publication Data
US 2017/0353843 A1 Dec. 7, 2017

Related U.S. Application Data

(63) Continuation of application No. 14/145,418, filed on Dec. 31, 2013, now Pat. No. 9,769,631, which is a (Continued)

(30) Foreign Application Priority Data

Sep. 30, 2011 (CN) .......................... 2011 1 0297790

(51) Int. Cl.
*H04W 4/14* (2009.01)
*H04L 12/58* (2006.01)
*H04L 29/06* (2006.01)

(52) U.S. Cl.
CPC ............... *H04W 4/14* (2013.01); *H04L 51/30* (2013.01); *H04L 51/38* (2013.01); *H04L 65/102* (2013.01);
(Continued)

(58) Field of Classification Search
CPC ........ H04W 4/14; H04L 65/40; H04L 65/102; H04L 65/1006; H04L 65/1016; H04L 51/30; H04L 51/38
See application file for complete search history.

(56) References Cited

U.S. PATENT DOCUMENTS 6,108,559 A 8/2000 Astrom et al.
6,370,390 B1 * 4/2002 Salin ....................... H04W 4/12
455/422.1
(Continued)

FOREIGN PATENT DOCUMENTS

CN 101529833 A 9/2009
CN 101971584 A 2/2011
(Continued)

OTHER PUBLICATIONS

"3rd Generation Partnership Project; Technical Specification Group Services and System Aspects; Support of Short Message Service (SMS) over generic 3GPP Internet Protocol (IP) access; Stage 2 (Release 11)," 3GPP TS 23.204, V11.1.0, Technical Specification, Sep. 2011, 53 pages.
(Continued)

*Primary Examiner* — Rasheed Gidado
(74) *Attorney, Agent, or Firm* — Conley Rose, P.C.

(57) ABSTRACT

A method for implementing resending of a short message includes, when an Internet Protocol short message gateway (IP-SM-GW) learns that in an Internet Protocol multimedia subsystem (IMS) domain, a short message fails to be sent to a receiver, sending, by the IP-SM-GW, the short message to a service center, so that the service center stores the short message; and when the receiver corresponding to the short message changes to available status, receiving, by the IP-SM-GW, the stored short message sent by the service center, and resending the short message to the receiver through the IMS domain, thereby implementing resending of a short
(Continued)

message request failing to be sent, improving availability of sending the short message request in the IMS, and improving user experience.

18 Claims, 25 Drawing Sheets

Related U.S. Application Data continuation of application No. PCT/CN2012/008187, filed on Sep. 25, 2012.

(52) U.S. Cl.
CPC ...... *H04L 65/1006* (2013.01); *H04L 65/1016* (2013.01); *H04L 65/40* (2013.01)

(56) References Cited

U.S. PATENT DOCUMENTS

| | | | |
|---|---|---|---|
| 7,069,030 B2 | 6/2006 | Yoon | |
| 7,290,041 B2 | 10/2007 | Mendiola et al. | |
| 7,715,856 B2 | 5/2010 | Shaheen | |
| 7,797,003 B2 | 9/2010 | Hill et al. | |
| 8,073,473 B2* | 12/2011 | Huggett | H04W 4/14 370/392 |
| 8,184,621 B2 | 5/2012 | Zhu et al. | |
| 8,254,971 B1 | 8/2012 | Mikan et al. | |
| 8,447,815 B2 | 5/2013 | Pattan | |
| 2008/0095337 A1 | 4/2008 | Cai et al. | |
| 2008/0194277 A1 | 8/2008 | Bai et al. | |
| 2009/0197622 A1* | 8/2009 | Atarius | H04L 51/30 455/466 |
| 2009/0213826 A1 | 8/2009 | Wang et al. | |
| 2009/0221310 A1 | 9/2009 | Chen et al. | |
| 2009/0319616 A1 | 12/2009 | Lewis, II et al. | |
| 2010/0222089 A1* | 9/2010 | Russell | H04L 51/30 455/466 |
| 2010/0261490 A1* | 10/2010 | Berry | H04W 4/12 455/466 |
| 2010/0325470 A1 | 12/2010 | Underwood et al. | |
| 2012/0099524 A1 | 4/2012 | Cai et al. | |
| 2012/0176964 A1* | 7/2012 | Cai | H04L 51/38 370/328 |
| 2013/0252649 A1* | 9/2013 | Siomina | H04W 4/029 455/466 |
| 2014/0133399 A1* | 5/2014 | Kim | H04W 4/14 370/328 |

FOREIGN PATENT DOCUMENTS

| | | |
|---|---|---|
| CN | 102027461 A | 4/2011 |
| EP | 2056557 A1 | 5/2009 |
| WO | 2008051506 A2 | 5/2008 |

OTHER PUBLICATIONS

"3rd Generation Partnership Project; Technical Specification Group Services and System Aspects; Support of Short Message Service (SMS) over generic 3GPP Internet Protocol (IP) access; Stage 2 (Release 12)," 3GPP TS 23.204, V12.3.0, Sep. 2013, 59 pages.

Nokia Siemens Networks, "SMS to an MSISDN-less IMS client—server to client communication," S2-113728, Jul. 11-15, 2011, 7 pages.

"3rd Generation Partnership Project; Technical Specification Group Services and System Aspects; Support of Short Message Service (SMS) in IMS without MSISDN; Stage 2 (Release 11)," 3GPP TR 23.863, V0.1.0, Technical Report, Jul. 2011, 25 pages.

"3rd Generation Partnership Project; Technical Specification Group Services and System Aspects; Support of SMS and MMS over generic 3GPP IP access; Release 7," 3GPP TR 23.804, V1.1.0, Technical Report, Apr. 2005, 30 pages.

"3rd Generation Partnership Project; Technical Specification Group Core Network and Terminals; Support of SMS over IP networks; Stage 3 (Release 7)," 3GPP TS 24.341, V1.0.0, Technical Specification, Nov. 2006, 46 pages.

"3rd Generation Partnership Project; Technical Specification Group Services and System Aspects; Support of Short Message Service (SMS) over generic 3GPP Internet Protocol (IP) access; Stage 2 (Release 7)," 3GPP TS 23.204, V7.5.0, Technical Specification, Mar. 2008, 20 pages.

Foreign Communication From a Counterpart Application, Chinese Application No. 201110297790.0, Chinese Office Action dated Oct. 8, 2014, 7 pages.

Foreign Communication From a Counterpart Application, Chinese Application No. 2011102977900, Chinese Search Report dated Sep. 25, 2014, 2 pages.

Foreign Communication From a Counterpart Application, European Application No. 12834832.3, Extended European Search Report dated Oct. 27, 2014, 8 pages.

Foreign Communication From a Counterpart Application, PCT Application No. PCT/CN2012/081871, English Translation of International Search Report dated Jan. 3, 2013, 2 pages.

Foreign Communication From a Counterpart Application, PCT Application No. PCT/CN2012/081871, English Translation of Written Opinion dated Jan. 3, 2013, 14 pages.

\* cited by examiner

METHOD AND APPARATUS FOR IMPLEMENTING RESENDING OF SHORT MESSAGE

CROSS-REFERENCE TO RELATED APPLICATIONS

This application is a continuation of U.S. patent application Ser. No. 14/145,418, filed on Dec. 31, 2013, which is a continuation of International Patent Application No. PCT/CN2012/081871, filed on Sep. 25, 2012. The International Patent Application claims priority to Chinese Patent Application No. 201110297790.0, filed on Sep. 30, 2011. All of the afore-mentioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of communications technologies, and in particular, to a method and an apparatus for implementing resending of a short message.

BACKGROUND

The conventional communication services between mobile terminals (such as call and short message services) depend on an mobile station international public switched telephone network/integrated services digital network number (MSISDN) of the terminal. However, a communication terminal working under machine to machine (M2M) communications cannot depend on an MSISDN for communication because such a terminal does not have an MSISDN.

In the prior art, a scenario where communication is performed without depending on an MSISDN includes a scenario where a server communicates with a terminal having no MSISDN using a short message service (SMS), and a scenario where a terminal having no MSISDN communicates with a terminal having no MSISDN using an SMS.

In the prior art, two terminals can identify each other using a session initiation protocol universal resource identifier (SIP URI) identity; therefore, the two terminals can communicate with each other by transmitting a short message in an Internet Protocol multimedia subsystem (IMS) through the SIP URI-form identity of each other.

However, the inventor finds that, in the prior art, in the process of transmitting a short message, if a short message cannot be stored in the transmission process because a called party cannot receive the current short message, it may result in that the called party cannot receive the short message when the called party is capable of receiving the short message.

SUMMARY

Embodiments of the present disclosure provide a method and an apparatus for implementing resending of a short message, so as to implement resending of a short message request failing to be sent.

In order to achieve the foregoing objective, the embodiments of the present disclosure adopt the following technical solutions.

A method for implementing resending of a short message includes, when an Internet Protocol short message gateway (IP-SM-GW) learns that in an IMS domain, a short message fails to be sent to a receiver, sending, by the IP-SM-GW, the short message to a service center, so that the service center stores the short message; and when the receiver corresponding to the short message changes to available status, receiving, by the IP-SM-GW, the stored short message sent by the service center, and resending the short message to the receiver through the IMS domain.

A method for implementing resending of a short message includes, when an IP-SM-GW learns that in an IMS domain, a short message fails to be sent to a receiver, storing, by the IP-SM-GW, a short message request corresponding to the short message failing to be sent; and when the receiver corresponding to the short message changes to available status, resending, by the IP-SM-GW, the short message, which has undergone storage processing, to the receiver through the IMS domain.

An apparatus for implementing resending of a short message includes a storage processing module configured to, when it is learnt that in an IMS domain, a short message fails to be sent to a receiver, send the short message to a service center, so that the service center stores the short message; and a resending module configured to, when the receiver corresponding to the short message changes to available status, receive the stored short message sent by the service center, and send the short message to the receiver through the IMS domain.

An apparatus for implementing resending of a short message includes a storage processing module configured to, when it is learnt that in an IMS domain, a short message fails to be sent to a receiver, store a short message request corresponding to the short message failing to be sent; and a resending module configured to, when the receiver corresponding to the short message changes to available status, resend the short message, which has undergone storage processing, to the receiver through the IMS domain.

In the technical solutions provided in the embodiments of the present disclosure, in the IMS domain, when the short message request fails to be sent to the receiver because the receiver is unavailable, storage processing is performed on the short message request, and when the receiver changes to available status, the short message request is resent to the receiver, so as to implement resending of the short message request failing to be sent, thereby improving availability of sending the short message request in the IMS and improving user experience.

BRIEF DESCRIPTION OF THE DRAWINGS

To illustrate the technical solutions according to the embodiments of the present disclosure more clearly, the accompanying drawings for describing the embodiments are introduced briefly in the following. The accompanying drawings in the following description are only some embodiments of the present disclosure, and persons of ordinary skill in the art can derive other drawings from the accompanying drawings without creative efforts.

DETAILED DESCRIPTION

The technical solutions of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

In this embodiment, in an IMS domain, a network of a sender may include the sender, a serving call session control function (S-CSCF) to which the sender belongs, an IP-SM-GW to which the sender belongs, and a service center (SC). In this embodiment, the SC refers to a service center of a short message. When the sender sends a short message to a receiver, a user terminal/a server may send a short message request to the receiver through the S-CSCF. In this embodiment, the network of the sender is referred to as a sending side, and the sender may include a user equipment (UE) or a server.

In this embodiment, in the IMS domain, a network where a receiver is located may include the receiver, an S-CSCF to which the receiver belongs, and an IP-SM-GW to which the receiver belongs. Definitely, the network may also include a home subscriber server (HSS), a short message service interworking mobile switching center (SMS-IWMSC), a short message service gateway mobile switching center (SMS-GMSC), a service center (SC), and an application server (AS). In this embodiment, the network where the receiver is located may be referred to as a receiving side, and the receiver may be a UE.

In this embodiment, in the IMS domain, the sender sends, through the S-CSCF of the sender, a short message request to the S-CSCF in the network where the receiver is located, and then the short message request received by the S-CSCF in the network of the receiver is processed by the IP-SM-GW or is processed directly by the S-CSCF.

Figure 1:
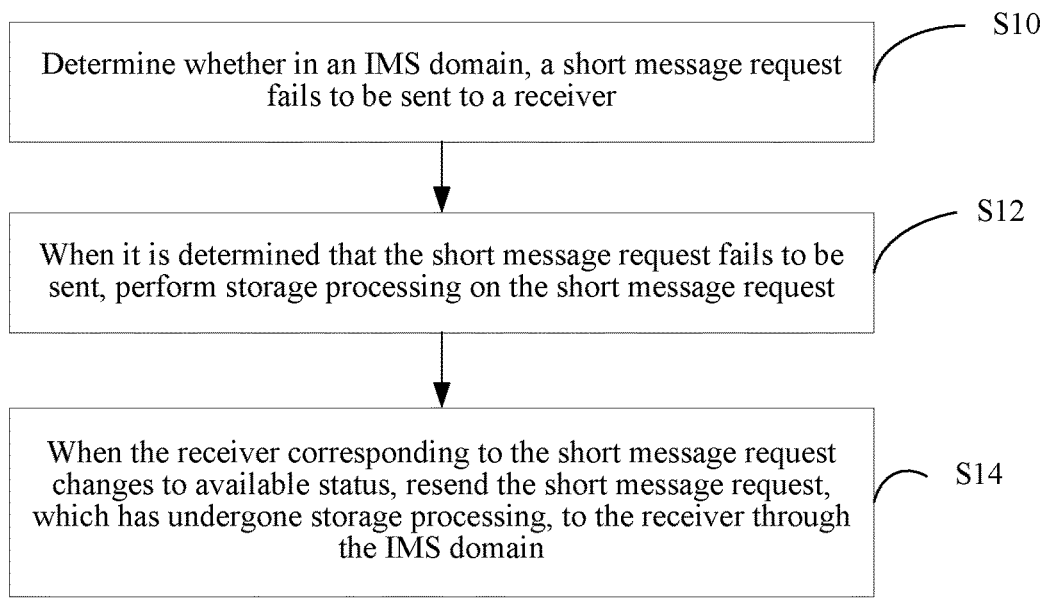
FIG. 1 is an overall flowchart of a method for implementing resending of a short message according to an embodiment of the present disclosure.

FIG. 1 is an overall flowchart of a method for implementing resending of a short message according to an embodiment of the present disclosure.

In this embodiment, step S10: Determine whether in an IMS domain, a short message request fails to be sent to a receiver. In this embodiment, in the IMS domain, because both an S-CSCF and an IP-SM-GW can process the short message request, the S-CSCF or the IP-SM-GW can determine whether the short message request fails to be sent to the receiver in this embodiment.

Step S12: When it is determined that the short message request fails to be sent, perform storage processing on the short message request. In this embodiment, in the IMS domain, when in a sending process, the short message cannot be sent to the receiver due to abnormality of the receiver, an SC in a network of the receiver can store a short message corresponding to the short message request, where the short message request may also be stored in the IP-SM-GW or in a short message service application server (SMS-AS). The above manner is not a unique implementation manner and is optional.

Step S14: When the receiver corresponding to the short message request changes to available status, resend the short message request, which has undergone storage processing, to the receiver through the IMS domain.

In this embodiment, in the IMS domain, when the SC in the network of the receiver stores the short message, after the abnormality of the receiver is eliminated, the short message is sent to IP-SM-GW, and the IP-SM-GW resends the short message to the receiver through the IMS domain. Alternatively, the request for sending the short message is stored in IP-SM-GW, and after the abnormality of the receiver is eliminated, the IP-SM-GW is triggered to resend the short message to the receiver through the IMS domain. Alternatively, the request for sending the short message is stored in SMS-AS, and after the abnormity of the receiver is eliminated, the SMS-AS is triggered to resend the short message to the receiver through the IMS domain.

In the embodiment of the present disclosure, in the IMS domain, when the short message request fails to be sent to the receiver because the receiver is unavailable, storage processing is performed on the short message request, and when the receiver changes to the available status, the short message request is resent to the receiver, so as to implement resending of the short message request failing to be sent, thereby improving availability of sending the short message request in the IMS and improving user experience.

The following gives a detailed description for different situations of the foregoing implementation.

Figure 2A:
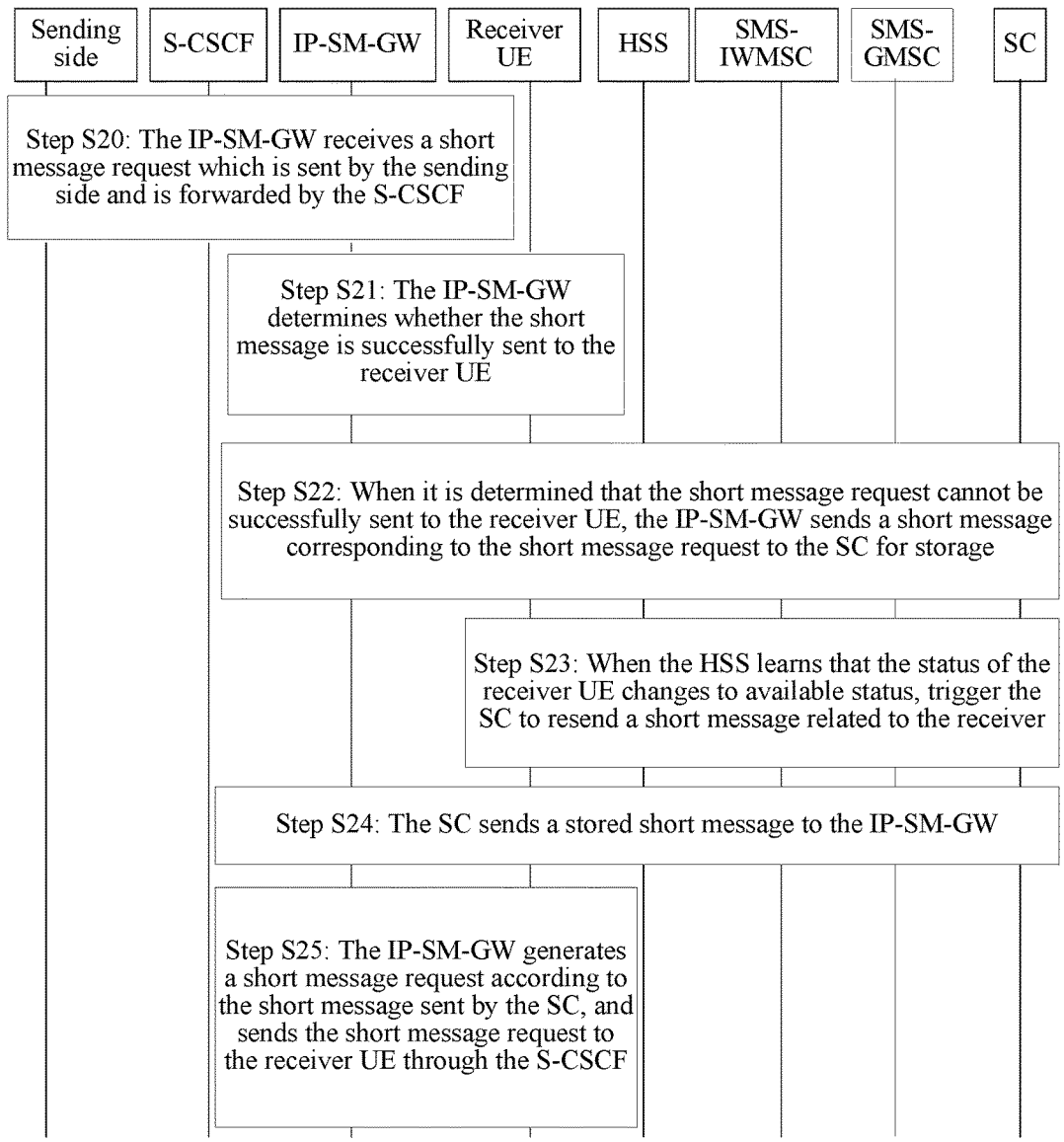
FIG. 2A is a flowchart of a method for implementing resending of a short message according to a first embodiment of the present disclosure.

FIG. 2A is a flowchart of a method for implementing resending of a short message according to a first embodiment of the present disclosure.

In this embodiment, a short message request for sending a short message passes through an IP-SM-GW in a network of a receiver. When in a sending process, the short message request cannot be successfully sent to the receiver due to abnormity of the receiver, that is, the sending fails, in this case, an SC may store the short message, and the short message request is resent after the abnormity of the receiver is eliminated.

Step S20: An IP-SM-GW receives a short message request which is sent by a sending side and is forwarded by an S-CSCF. In this embodiment, the short message request includes content of a short message and information of a receiver UE. Definitely, the short message request may further include other information, such as information of an address of an SC storing the short message when the short message fails to be sent, where the address of the SC is an address of an SC to which a sender belongs and is carried when the sender sends the short message. The short message request is a session initiation protocol (SIP) request message.

Step S21: The IP-SM-GW determines whether the short message is successfully sent to the receiver UE. It may be understood that, the IP-SM-GW determines whether the short message fails to be sent to the receiver UE. In this embodiment, the IP-SM-GW may determine, according to a received response message, whether the short message is successfully sent to the receiver UE. In this embodiment, in a case where the receiver is unreachable, a memory of the receiver UE is full, or the receiver does not support a SIP message type and the like, the network where the receiver is located returns, to the IP-SM-GW, a response message of a failure or a response message of a short message failure report. Therefore, the IP-SM-GW may determine, through the returned response message, that the short message is not successfully sent to the receiver UE, and it may be considered that the short message fails to be sent.

Figure 2B:
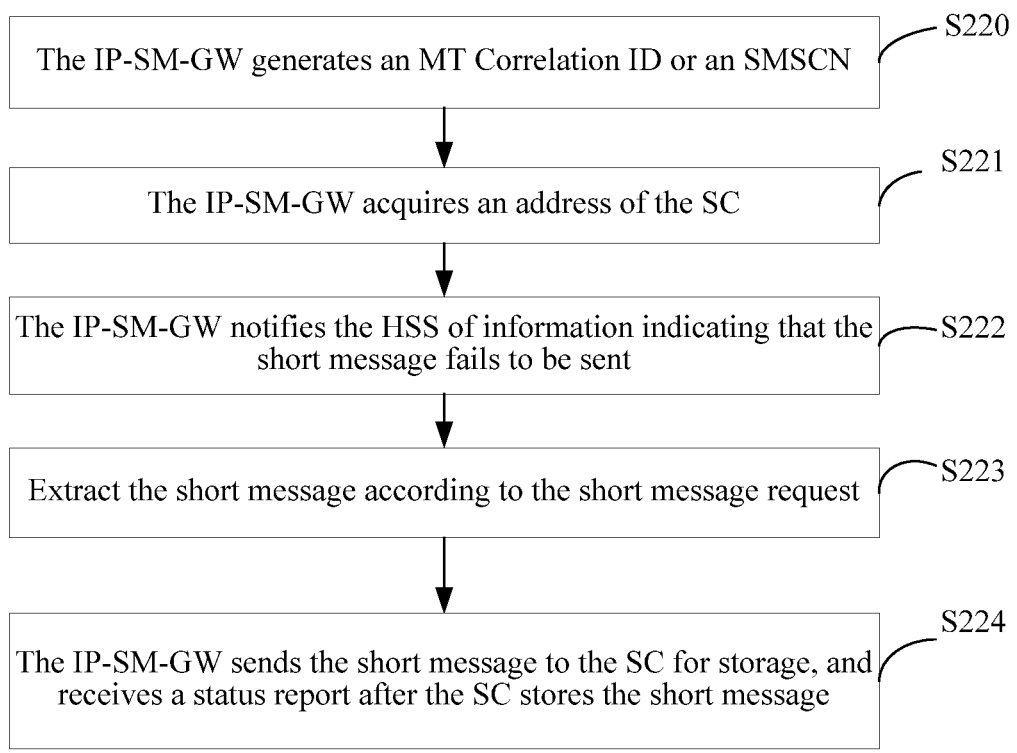
FIG. 2B is a flowchart of step S22 in the method for implementing resending of a short message in FIG. 2A.

Step S22: When it is determined that the short message request cannot be successfully sent to the receiver UE, the IP-SM-GW sends the short message corresponding to the short message request to the SC for storage. In this embodiment, as shown in FIG. 2B, the step in which the IP-SM-GW sends the short message to the SC for storage may further include the following steps.

Step S220: The IP-SM-GW generates a correlation identifier (Mobile Terminated Correlation identifier (MT Correlation ID)) or a short message service correlation number (SMSCN). The IP-SM-GW saves the MT Correlation ID or the SMSCN and a SIP URI-form identity of the receiver of the short message. Definitely, optionally, the IP-SM-GW may also save the MT Correlation ID or the SMSCN and SIP URI-form identities of the receiver of the short message. The MT Correlation ID format is MCC (3 bits)+MNC (3 bits)+ sender ID (9 bits), where the MCC is a mobile country code, the MNC is a mobile network code, the Sender ID is a 9-bit value randomly generated by a terminal, and the 9-bit value should include an identification number of an HSS to which the receiver UE belongs, so that the HSS to which the receiver belongs can be determined through the sender ID in the correlation identifier (MT Correlation ID). The SMSCN is a 3-bit value generated by the terminal. In this embodiment, the IP-SM-GW generates the correlation identifier (MT Correlation ID) or the SMSCN for the receiver, so that after the UE is available, the SC obtains a corresponding short message through matching using the MT Correlation ID or the SMSCN and resends the short message; and the IP-SM-GW obtains the SIP URI identity of the sender or the receiver of the short message through matching using the MT Correlation ID or the SMSCN, generates a SIP request message carrying content of the short message, and sends the SIP request message to the receiver UE.

Step S221: The IP-SM-GW acquires the address of the SC. In this embodiment, the address of the SC to which the receiver of the short message belongs may be acquired and the address of the SC to which the sender of the short message belongs may be acquired, and the acquired address is stored.

When the address of the SC to which the receiver of the short message belongs is acquired, if the IP-SM-GW saves the address of the SC to which the receiver UE belongs, the address of the SC is extracted directly; and if the IP-SM-GW does not know the address of the SC to which the receiver UE belongs, the IP-SM-GW acquires the address of the SC to which the receiver UE belongs from the HSS to which the receiver UE belongs. In this embodiment, the IP-SM-GW queries the HSS for the address of the SC to which the receiver UE belongs. If the HSS does not configure an address of the SC for the receiver UE either, the HSS allocates an address of the SC for the receiver UE according to identity information (SIP URI, international mobile subscriber identity (IMSI)) of the receiver UE. In this embodiment, the IP-SM-GW needs to save the address of the SC after acquiring the address of the SC to which the receiver belongs.

When the address of the SC to which the sender of the short message belongs is acquired, the IP-SM-GW extracts the address of the SC to which the sender belongs from the short message request received in step S20, and saves the address of the SC.

Step S222: The IP-SM-GW notifies the HSS of information indicating that the short message fails to be sent. In this embodiment, the notification message at least includes an identity (IMSI or SIP URI) of the receiver, the address of the SC, the correlation identifier or the SMSCN, and may further include the address of the IP-SM-GW and the reason of the failure of the sending. After receiving the notification, the HSS saves the foregoing information in message waiting data (MWD) information.

Step S223: Extract the short message according to the short message request. In this embodiment, the short message includes information such as the content of the short message, a source address and a destination address. The IP-SM-GW modifies the source address and the destination address in the extracted short message, and does not modify the content of the short message.

In this embodiment, the IP-SM-GW modifies the source address in the short message of the sender to the MT Correlation ID, modifies the destination address to the address of the SC, and does not modify the content of the short message. Alternatively, the IP-SM-GW modifies the source address in the short message of the sender to the SMSCN and the IP-SM-GW ID, modifies the destination address to the address of the SC, and does not modify the content of the short message. Alternatively, when the IP-SM-GW does not generate the MT Correlation ID or the SMSCN, the IP-SM-GW may query the HSS for subscription information of the receiver according to the SIP URI of the receiver, and find the IMSI of the receiver. Definitely, the sender also carries its identity information, such as the IMSI of the sender, in the form of a telephone number in the short message, and the IP-SM-GW saves the identity (such as IMSI) of the sender and the identity (IMSI) of the receiver. The IP-SM-GW modifies the source address in the short message of the sender to a special prefix and the IMSI of the sender, where the special prefix indicates that the short message is a short message failing to be sent, modifies the destination address to a called IMSI, and does not modify the content of the short message.

In this embodiment, the short message sent by the sender has different relay-layer protocol (RP) formats, where a first RP format is RP-MO-DATA, and a second RP format is RP-MT-DATA.

When the IP-SM-GW needs to send, to the SC, the short message failing to be sent, the IP-SM-GW identifies the format of the short message of the sender. When the format of the short message of the sender is the first format, the format of the short message does not need to be modified, and only the source address and the destination address in the short message need to be modified; while when the format of the short message of the sender is the second format, this format is converted into the first format, and then the source address and the destination address in the short message are modified.

Step S224: The IP-SM-GW sends the short message to the SC for storage, and receives a status report after the SC stores the short message. In this embodiment, the IP-SM-GW sends the short message to the SC through an SMS-IWMSC, and receives, through the SMS-IWMSC, the status report sent by the SC after storing the short message. The SC determines, by identifying the MT Correlation ID or the SMSCN or a special prefix value, that the short message is a short message failing to be sent, and stores the short message instead of continuing to send the short message. The SC stores the received short message, and stores the short message and the MT Correlation ID or the SMSCN or the IMSI of the receiver.

Step 23: When the HSS learns that the status of the receiver UE changes to available status, trigger the SC to resend the short message related to the receiver. In this embodiment, after the UE is switched on and performs IMS registration, or in a case where the memory of the UE is available, or the UE changes to support the SIP short message from not supporting the SIP short message, or the UE is reachable and the like, the HSS may learn that the receiver UE changes to the available status from unavailable status. In this embodiment, the HSS may trigger, in a manner of sending an alert service centre (SC) message, the SC to resend the short message. In this embodiment, the HSS may send the alert service centre message to the SC through the SMS-IWMSC.

In this embodiment, the HSS may carry the MT Correlation ID or the SMSCN or the IMSI of the receiver UE in the alert service centre message. The SC may acquire a corresponding short message from the stored short message according to the MT Correlation ID or the SMSCN or the IMSI of the receiver UE carried in the alert service centre message. That is, the SC may find, according to the MT Correlation ID, the short message associated with the MT Correlation ID or the SMSCN, or find the short message of which the destination address is the IMSI of the receiver UE.

Figure 2C:
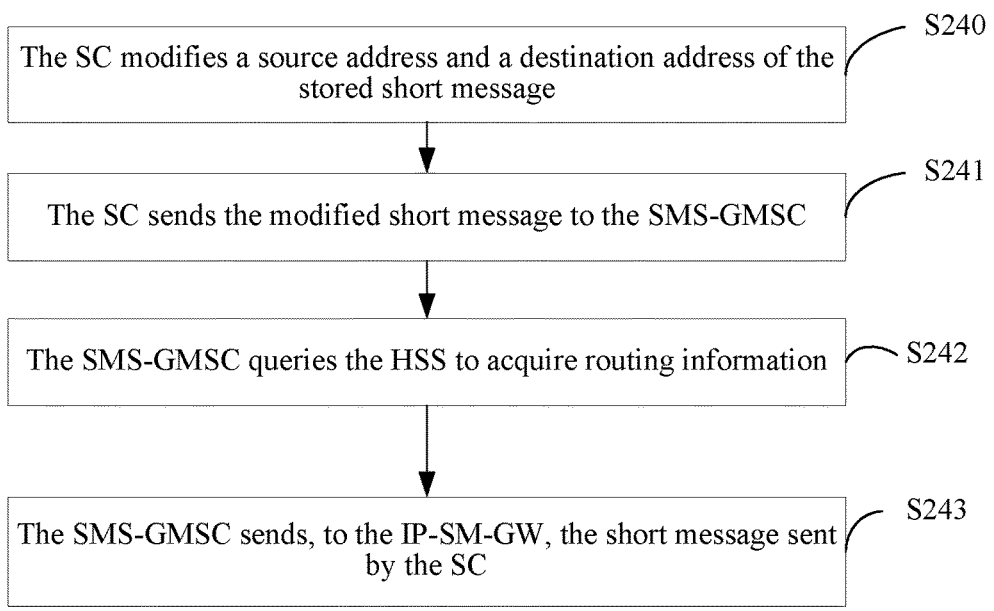
FIG. 2C is a flowchart of step S24 in the method for implementing resending of a short message in FIG. 2A.

Step 24: The SC sends the stored short message to IP-SM-GW. In this embodiment, as shown in FIG. 2C, the step may include the following.

Step S240: The SC modifies the source address and the destination address of the stored short message.

In this embodiment, for a case where the source address in the stored short message is the MT Correlation ID, the SC modifies the source address of the stored short message to the address of the SC, modifies the destination address to the MT Correlation ID, and does not modify the content of the short message. Alternatively, for a case where the source address in the stored short message is the SMSCN and the IP-SM-GW ID, the SC modifies the source address of the stored short message to the address of the SC, modifies the destination address to the SMSCN and the IP-SM-GW ID, and does not modify the content of the short message. Alternatively, in a case where the source address in the stored short message is the special prefix and the IMSI of the sender, the SC modifies the source address of the stored short message to a caller identity, and does not modify the destination address and the content of the short message.

Step S241: The SC sends the modified short message to an SMS-GMSC.

Step S242: The SMS-GMSC queries the HSS to acquire routing information, that is, acquire an address of an IP-SM-GW to which the receiver belongs, and returns the acquired address to the SMS-GMSC. In this embodiment, the SMS-GMSC may find, according to the MT Correlation ID, the HSS to which the receiver belongs, and the HSS may further find an address of a corresponding IP-SM-GW according to the MT Correlation ID; or find an address of a corresponding IP-SM-GW through the IMSI of the sender and the IMSI of the receiver.

Step S242 is performed only in a case where the destination address of the short message sent by the SC is the MT Correlation ID or the called IMSI.

Step S243: The SMS-GMSC sends, to the IP-SM-GW, the short message sent by the SC.

Step S25: The IP-SM-GW generates a short message request according to the short message sent by the SC, and sends the short message request to the receiver UE through the S-CSCF.

In this embodiment, the IP-SM-GW finds SIP URIs of the corresponding sender and receiver according to the source address or the destination address in the short message sent by the SC, so as to generate the short message request, where the short message request may be a SIP request message. In this embodiment, the corresponding SIP URI of the receiver or the corresponding SIP URIs of the sender and the receiver may be found according to the MT Correlation ID, or the corresponding SIP URI of the receiver or the corresponding SIP URIs of the sender and the receiver may be found according to the SMSCN, or the corresponding SIP URI of the receiver and the corresponding SIP URI of the sender are found according to the IMSI of the receiver and the IMSI of the sender.

In the embodiment of the present disclosure, in the IMS domain, when the short message request fails to be sent to the receiver because the receiver is unavailable, IP-SM-GW sends the short message corresponding to the short message request to the SC for storage processing, and when the receiver changes to the available status, resends the short message request to the receiver, so as to implement resending of the short message request failing to be sent, thereby improving availability of sending the short message request in the IMS and improving user experience.

Figure 3A:
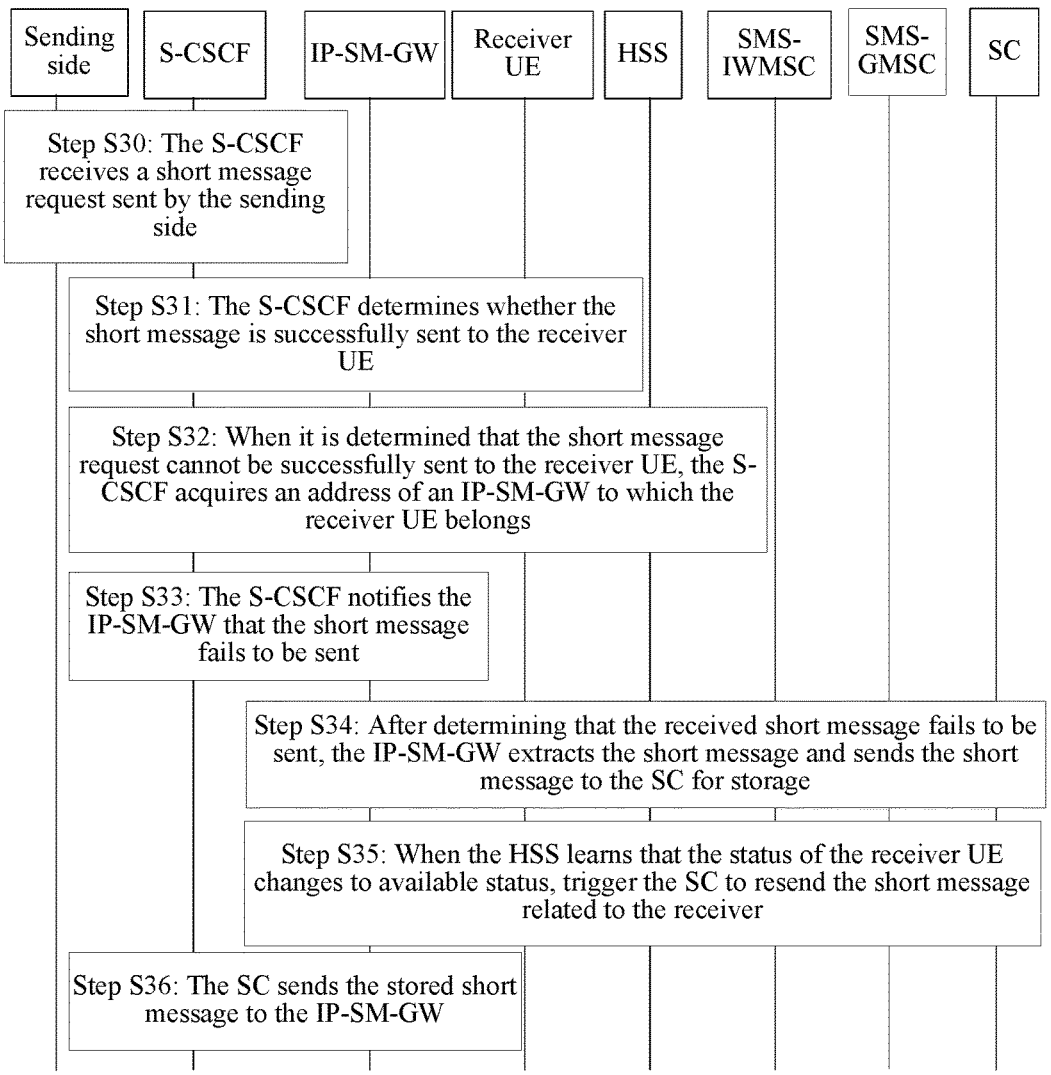
FIG. 3A is a flowchart of a method for implementing resending of a short message according to a second embodiment of the present disclosure.

FIG. 3A is a flowchart of a method for implementing resending of a short message according to a second embodiment of the present disclosure.

In this embodiment, a short message request for sending a short message does not pass through an IP-SM-GW in a network of a receiver.

Step S30: An S-CSCF receives a short message request sent by a sending side. In this embodiment, the short message request includes content of a short message and information of a receiver UE. Definitely, the short message request may also include other information, such as information of an address of an SC storing the short message when the short message fails to be sent, where the address of the SC is an address of an SC to which a sender belongs and is carried when the sender sends the short message. The short message request is a SIP request message.

Step S31: The S-CSCF determines whether the short message is successfully sent to the receiver UE. In this embodiment, the S-CSCF may determine, according to information such as registration information of the receiver UE saved by the S-CSCF or a received response message, whether the short message is successfully sent to the receiver UE. In this embodiment, if the receiver UE is switched off, the registration information of the receiver UE saved by the S-CSCF is off-line or off-net information, that is, the S-CSCF can determine, according to the registration information of the receiver UE saved by the S-CSCF, whether the receiver UE is switched off. If it is determined that the receiver UE is in off status, the short message cannot be successfully sent to the receiver UE; or in a case where the memory of the receiver UE is full or when the receiver UE does not support a SIP message type and the like, the receiver UE returns a response message of a failure or a response message of a short message failure report to the S-CSCF. Therefore, the S-CSCF can determine, through the returned response message, that the short message is not successfully sent to the receiver UE, and it may be considered that the short message fails to be sent.

Step S32: When it is determined that the short message request cannot be successfully sent to the receiver UE, the S-CSCF acquires an address of an IP-SM-GW to which the receiver UE belongs. In this embodiment, if the S-CSCF saves the address of the IP-SM-GW to which the receiver UE belongs, the address of the IP-SM-GW is extracted directly; and if the S-CSCF does not save the address of the IP-SM-GW to which the receiver UE belongs, the address of the IP-SM-GW is acquired by requesting an HSS to which the receiver UE belongs. In this embodiment, if the HSS does not configure the address of the IP-SM-GW for the receiver UE, the HSS allocates an address of the IP-SM-GW for the receiver UE according to identity information (SIP URI, IMSI) of the receiver UE.

Step S33: The S-CSCF notifies the IP-SM-GW that the short message fails to be sent. In this embodiment, the notification message carries the short message.

Figure 3B:
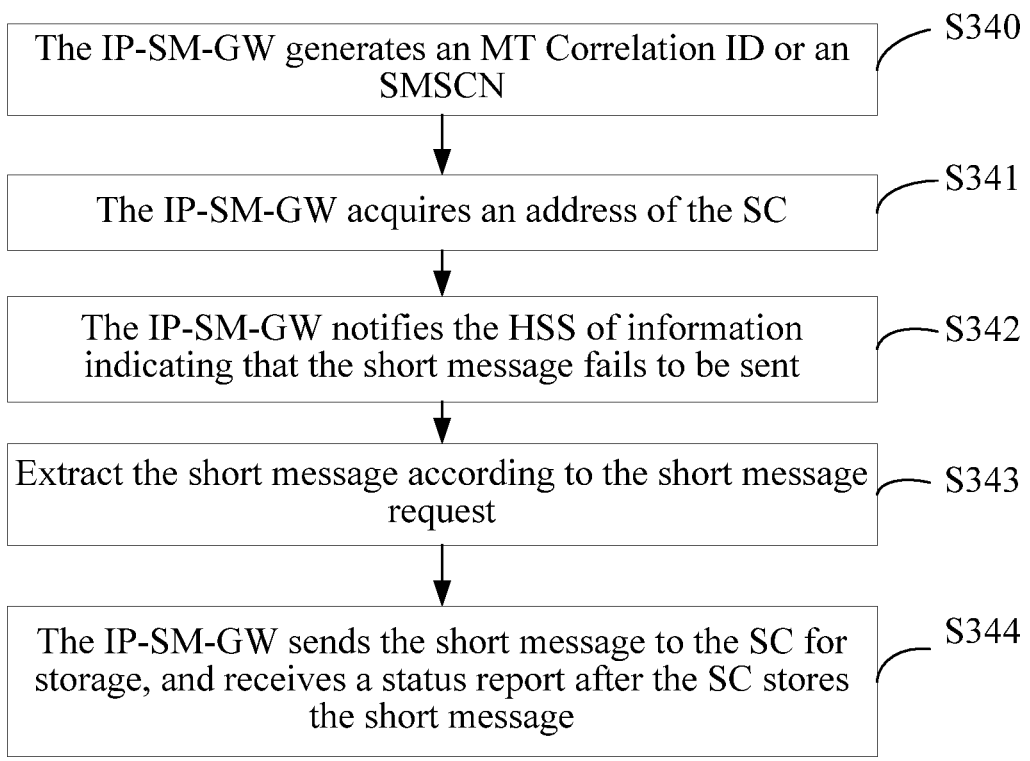
FIG. 3B is a flowchart of step S34 in the method for implementing resending of a short message in FIG. 3A.

Step S34: After determining that the received short message fails to be sent, the IP-SM-GW extracts the short message and sends the short message to the SC for storage. In this embodiment, as shown in FIG. 3B, the step in which the IP-SM-GW sends the short message to the SC for storage may further include the following.

Step S340: The IP-SM-GW generates a correlation identifier (MT Correlation ID) or an SMSCN. The IP-SM-GW saves the MT Correlation ID or the SMSCN and a SIP URI-form identity of the receiver of the short message. Definitely, optionally, the IP-SM-GW may also save the MT Correlation ID or the SMSCN and SIP URI-form identities of the sender and the receiver of the short message. The MT Correlation ID format is MCC (3 bits)+MNC (3 bits)+sender ID (9 bits), where the MCC is a mobile country code, the MNC is a mobile network code, the Sender ID is a 9-bit value randomly generated by a terminal, and the 9-bit value should include an identification number of the HSS to which the receiver UE belongs, so that the HSS to which the receiver belongs can be determined using the sender ID in the correlation identifier (MT Correlation ID). The SMSCN is a 3-bit value generated by the terminal. In this embodiment, the IP-SM-GW generates the correlation identifier (MT Correlation ID) or the SMSCN for the receiver terminal, so that after the UE is available, the SC obtains a corresponding short message through matching using the MT Correlation ID or the SMSCN, and resends the short message; and the IP-SM-GW obtains the SIP URI-form identity of the sender or the receiver of the short message through matching using the MT Correlation ID or the SMSCN, generates a SIP request message carrying the content of the short message, and sends the SIP request message to the receiver UE.

Step S341: The IP-SM-GW acquires the address of the SC. In this embodiment, the address of the SC to which the receiver of the short message belongs may be acquired and the address of the SC to which the sender of the short message belongs may be acquired, and the acquired address is stored.

When the address of the SC to which the receiver of the short message belongs is acquired, if the IP-SM-GW saves the address of the SC to which the receiver UE belongs, the address of the SC is extracted directly; and if the IP-SM-GW does not know the address of the SC to which the receiver UE belongs, the IP-SM-GW acquires the address of the SC to which the receiver UE belongs from the HSS to which the receiver UE belongs. In this embodiment, the IP-SM-GW queries the HSS for the address of the SC to which the receiver UE belongs. If the HSS does not configure an address of the SC for the receiver UE either, the HSS allocates an address of the SC for the receiver UE according to identity information (SIP URI, IMSI) of the receiver UE. In this embodiment, the IP-SM-GW needs to save the address of the SC after acquiring the address of the SC to which the receiver belongs.

When the address of the SC to which the sender of the short message belongs is acquired, the IP-SM-GW extracts the address of the SC to which the sender belongs from the short message request received in step S20, and saves the address of the SC.

Step S342: The IP-SM-GW notifies the HSS of information indicating that the short message fails to be sent. In this embodiment, the notification message at least includes an identity (IMSI or SIP URI) of the receiver, the address of the SC, the correlation identifier or the SMSCN, and may further include the address of the IP-SM-GW and the reason of the failure of the sending. After receiving the notification, the HSS saves the foregoing information in MWD information.

Step S343: Extract the short message according to the short message request. In this embodiment, the short message includes information such as the content of the short message, a source address and a destination address. The IP-SM-GW modifies the source address and the destination address in the extracted short message, and does not modify the content of the short message.

In this embodiment, the IP-SM-GW modifies the source address in the short message of the sender to the MT Correlation ID, modifies the destination address to the address of the SC, and does not modify the content of the short message. Alternatively, the IP-SM-GW modifies the source address in the short message of the sender to the SMSCN and the IP-SM-GW ID, modifies the destination address to the address of the SC, and does not modify the content of the short message. Alternatively, when the IP-SM-GW does not generate the MT Correlation ID or the SMSCN, the IP-SM-GW may query the HSS for subscription information of the receiver according to the SIP URI of the receiver, and find the IMSI of the receiver. Definitely, the sender also carries its identity information, such as the IMSI of the sender, in the form of a telephone number in the short message, and the IP-SM-GW saves the identity (such as IMSI) of the sender and the identity (IMSI) of the receiver. The IP-SM-GW modifies the source address in the short message of the sender to a special prefix and the IMSI of the sender, where the special prefix indicates that the short message is a short message failing to be sent, modifies the destination address to a called IMSI, and does not modify the content of the short message.

In this embodiment, the short message sent by the sender has different RP formats, where a first RP format is RP-MO-DATA, and a second RP format is RP-MT-DATA.

When the IP-SM-GW needs to send, to the SC, the short message failing to be sent, the IP-SM-GW identifies the format of the short message of the sender. When the format of the short message of the sender is the first format, the format of the short message does not need to be modified, and only the source address and the destination address in the short message need to be modified; and when the format of the short message of the sender is the second format, this format is converted into the first format, and then the source address and the destination address in the short message are modified.

Step S344: The IP-SM-GW sends the short message to the SC for storage, and receives a status report after the SC stores the short message. In this embodiment, the IP-SM-GW sends the short message to the SC through an SMS-IWMSC, and receives, through the SMS-IWMSC, the status report sent by the SC after storing the short message. The SC determines, by identifying the MT Correlation ID or the SMSCN or a special prefix value, that the short message is a short message failing to be sent, and stores the short message instead of continuing to send the short message. The SC stores the received short message, and stores association between the short message and the MT Correlation ID or the SMSCN or the IMSI of the receiver.

Step S35: When the HSS learns that the status of the receiver UE changes to available status, trigger the SC to resend the short message related to the receiver. In this embodiment, after the UE is switched on and performs IMS registration, or in a case where the memory of the UE is available, or when the UE changes to support the SIP short message from not supporting the SIP short message, or when the UE is reachable and the like, the HSS may learn that the receiver UE changes to the available status from unavailable status. In this embodiment, the HSS may trigger, in a manner of sending an alert SC message, the SC to resend the short message. In this embodiment, the HSS sends the alert service center message to the service center, where the alert service center message carries the correlation identifier or the SMSCN or the IMSI of the receiver UE. After receiving the message, the service center sends the stored short message associated with the correlation identifier. In this embodiment, the HSS may send the alert service centre message to the SC through the SMS-IWMSC.

In this embodiment, the HSS may carry the MT Correlation ID or the SMSCN or the IMSI of the receiver UE in the alert service centre message. The SC may acquire a corresponding short message from the stored short message according to the MT Correlation ID or the SMSCN or the IMSI of the receiver UE carried in the alert service centre message. That is, the SC may find, according to the MT Correlation ID, the short message associated with the MT Correlation ID or the SMSCN, or find the short message of which the destination address is the IMSI of the receiver UE.

Figure 3C:
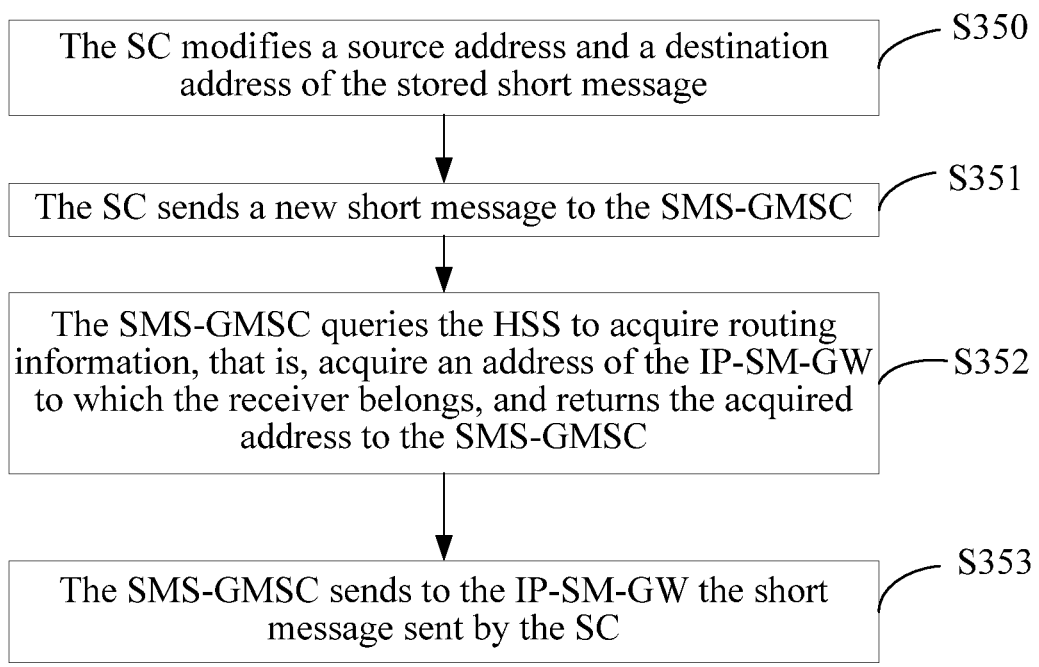
FIG. 3C is a flowchart of step S35 in the method for implementing resending of a short message in FIG. 3A.

Step 36: The SC sends the stored short message to IP-SM-GW. In this embodiment, as shown in FIG. 3C, the step may include the following.

Step S350: The SC modifies the source address and the destination address of the stored short message.

In this embodiment, for a case where the source address in the stored short message is the MT Correlation ID, the SC modifies the source address of the stored short message to the address of the SC, modifies the destination address to the MT Correlation ID, and does not modify the content of the short message. Alternatively, for a case where the source address in the stored short message is the SMSCN and the IP-SM-GW ID, the SC modifies the source address of the stored short message to the address of the SC, modifies the destination address to the SMSCN and the IP-SM-GW ID, and does not modify the content of the short message. Alternatively, in a case where the source address in the stored short message is the special prefix and the IMSI of the sender, the SC modifies the source address of the stored short message to a caller identity, and does not modify the destination address and the content of the short message.

Step S351: The SC sends a new short message to the SMS-GMSC.

Step S352: The SMS-GMSC queries the HSS to acquire routing information, that is, acquire an address of an IP-SM-GW to which the receiver belongs, and returns the acquired address to the SMS-GMSC. In this embodiment, the SMS-GMSC may find, according to the MT Correlation ID, the HSS to which the receiver belongs, and the HSS may further find an address of a corresponding IP-SM-GW according to the MT Correlation ID; or find an address of a corresponding IP-SM-GW through the IMSI of the sender and the IMSI of the receiver.

Step S352 is performed only in a case where the destination address of the short message sent by the SC is the MT Correlation ID or the called IMSI.

Step S353: The SMS-GMSC sends to the IP-SM-GW the short message sent by the SC.

Step 36: The IP-SM-GW generates a short message request according to the short message sent by the SC, and sends the short message request to the receiver UE through the S-CSCF.

In this embodiment, IP-SM-GW finds SIP URIs of the corresponding sender and receiver according to the source address or the destination address in the short message sent by the SC, so as to generate the short message request, where the short message request may be a SIP request message. In this embodiment, the corresponding SIP URI of the receiver or the corresponding SIP URIs of the sender and the receiver may be found according to the MT Correlation ID, or the corresponding SIP URI of the receiver or the corresponding SIP URIs of the sender and the receiver may be found according to the SMSCN, or the corresponding SIP URI of the receiver and the corresponding SIP URI of the sender are found according to the IMSI of the receiver and the IMSI of the sender.

In the embodiment of the present disclosure, in the IMS domain, when the short message request fails to be sent to the receiver because the receiver is unavailable, the IP-SM-GW sends the short message corresponding to the short message request to the SC for storage processing, and when the receiver changes to the available status, resends the short message request to the receiver, so as to implement resending of the short message request failing to be sent, thereby improving availability of sending the short message request in the IMS and improving user experience.

Figure 4:
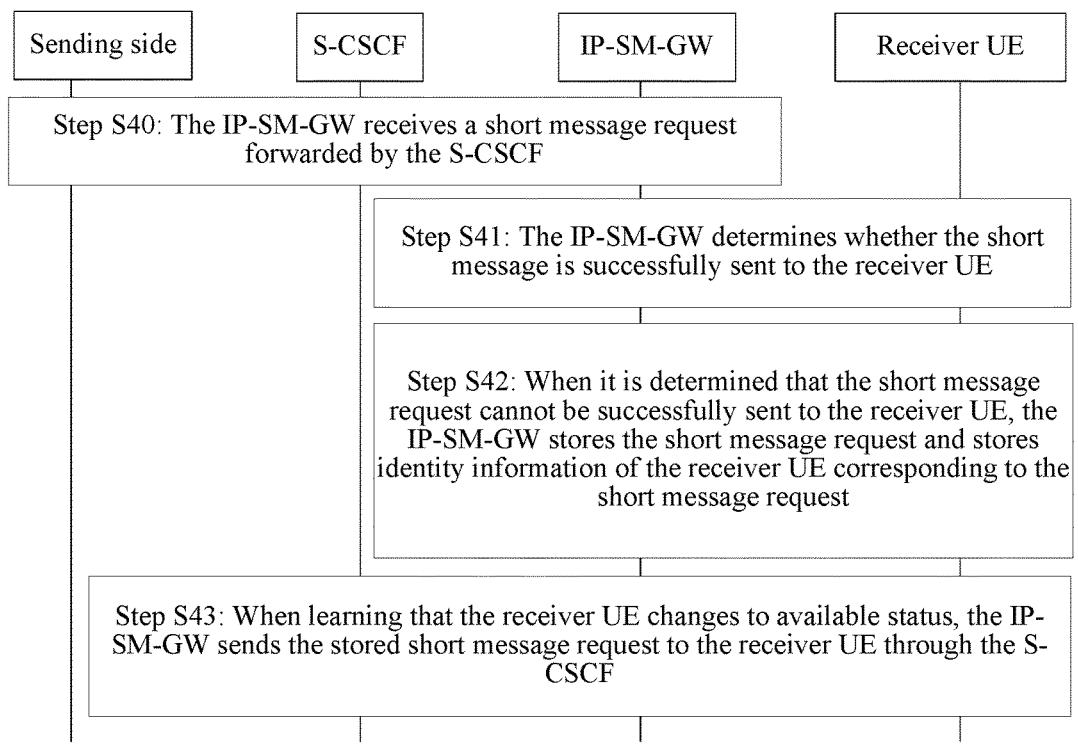
FIG. 4 is a flowchart of a method for implementing resending of a short message according to a third embodiment of the present disclosure.

FIG. 4 is a flowchart of a method for implementing resending of a short message according to a third embodiment of the present disclosure.

In this embodiment, a short message request for sending a short message passes through an IP-SM-GW in a network of a receiver. When in a sending process, the short message cannot be sent to the receiver due to abnormity of the receiver, the short message request may be stored in the IP-SM-GW. After the abnormity of the receiver is eliminated, the IP-SM-GW is triggered to resend the short message request.

Step S40: An IP-SM-GW receives a short message request forwarded by an S-CSCF. In this embodiment, the short message request includes content of a short message and information of a receiver UE. Definitely, the short message request may also include indication information carried by a sender, where the indication information is used for indicating that the short message request is stored locally if the short message request fails to be sent. A network entity stores, according to the indication and in an IP-SM-GW to which the receiver UE belongs, the short message request failing to be sent.

Step S41: The IP-SM-GW determines whether the short message is successfully sent to the receiver UE. In this embodiment, the IP-SM-GW may determine, according to a received response message, whether the short message is successfully sent to the receiver UE. In this embodiment, when the receiver UE is unreachable, or the memory of the receiver UE is full, or the receiver UE does not support a SIP message type, the receiver UE returns a response message of a failure or a response message of a short message failure report to the IP-SM-GW. Therefore, the IP-SM-GW can determine, through the returned response message, that the short message is not successfully sent to the receiver UE, and it may be considered that the short message fails to be sent.

Step S42: When it is determined that the short message request cannot be successfully sent to the receiver UE, the IP-SM-GW stores the short message request and stores identity information of the receiver UE corresponding to the short message request.

Step S43: When the IP-SM-GW learns that the receiver UE changes to available status, send the stored short message request to the receiver UE through the S-CSCF. In this embodiment, after the UE is switched on and performs IMS registration, or in a case where the memory of the UE is available, or when the UE changes to support the SIP short message from not supporting the SIP short message, or when the UE is available again and the like, the IP-SM-GW may learn that the receiver UE changes to the available status from unavailable status.

In the embodiment of the present disclosure, in the IMS domain, when the short message request fails to be sent to the receiver because the receiver is unavailable, the IP-SM-GW performs storage processing on the short message request, and when the receiver changes to the available status, resends the short message request to the receiver, so as to implement resending of the short message request failing to be sent, thereby improving availability of sending the short message request in the IMS and improving user experience.

Figure 5A:
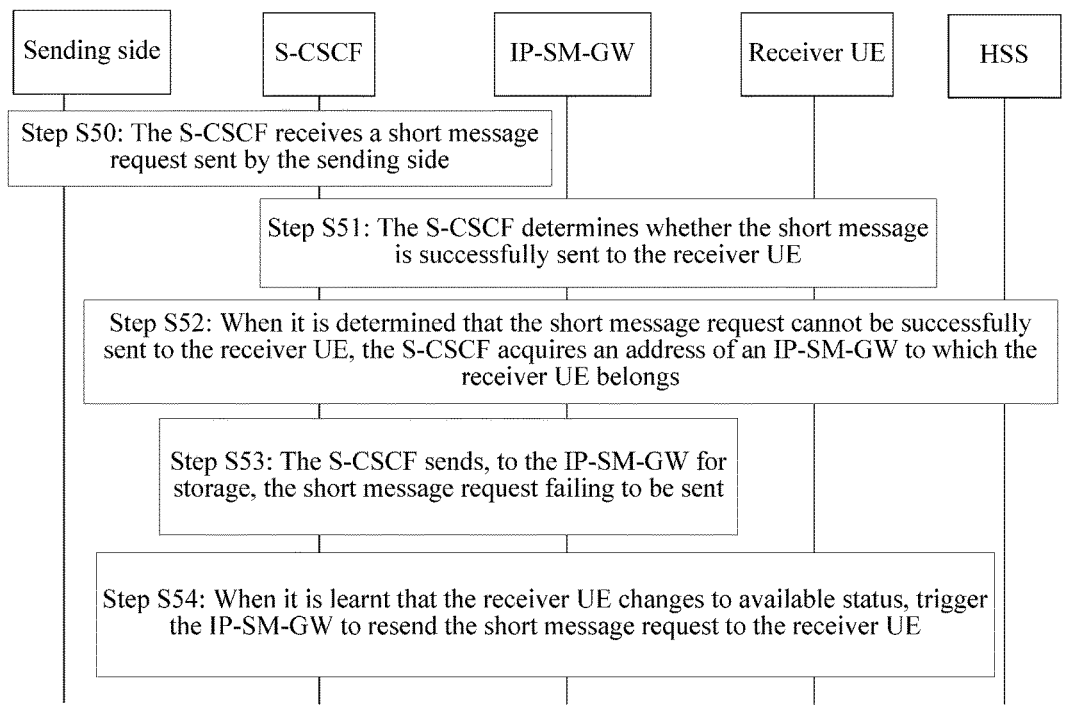
FIG. 5A is a flowchart of a method for implementing resending of a short message according to a fourth embodiment of the present disclosure.

FIG. 5A is a flowchart of a method for implementing resending of a short message according to a fourth embodiment of the present disclosure.

In this embodiment, a short message request for sending a short message does not pass through an IP-SM-GW. When in a sending process, the short message cannot be sent to a receiver due to abnormity of the receiver, the short message request may be sent and stored in the IP-SM-GW. After the abnormity of the receiver is eliminated, the IP-SM-GW is triggered to resend the short message request.

Step S50: An S-CSCF receives a short message request sent by a sending side. In this embodiment, the short message request is a SIP request message, and the short message request includes information such as content of a short message and information of a receiver UE. Definitely, the short message request may also include indication information carried by a sender, where the indication information is used for indicating that the short message or the short message request is stored locally if the short message request fails to be sent. A network entity stores, according to the indication and in the IP-SM-GW of the receiver, the short message or the short message request failing to be sent.

Step S51: The S-CSCF determines whether the short message is successfully sent to the receiver UE. In this embodiment, the S-CSCF may determine, according to registration information of the receiver UE saved by the S-CSCF or a received response message, whether the short message is successfully sent to the receiver UE. In this embodiment, if the receiver UE is switched off, the registration information of the receiver UE saved by the S-CSCF is off-line or off-net information, that is, the S-CSCF can determine, according to the registration information of the receiver UE saved by the S-CSCF, whether the receiver UE is switched off. If it is determined that the receiver UE is in off status, the short message cannot be successfully sent to the receiver UE; or when the receiver UE is unreachable, or the memory of the receiver UE is full, or the receiver UE does not support a SIP message type, the receiver UE returns a response message of a failure or a response message of a short message failure report to the S-CSCF. Therefore, the S-CSCF can determine, through the returned response message, that the short message is not successfully sent to the receiver UE, and it may be considered that the short message fails to be sent.

Step S52: When it is determined that the short message request cannot be successfully sent to the receiver UE, the S-CSCF acquires an address of an IP-SM-GW to which the receiver UE belongs. In this embodiment, if the S-CSCF saves the address of the IP-SM-GW to which the receiver UE belongs, the address of the IP-SM-GW is extracted directly; and if the S-CSCF does not save the address of the IP-SM-GW to which the receiver UE belongs, the address of the IP-SM-GW is acquired by requesting an HSS to which the receiver UE belongs. In this embodiment, if the HSS does not configure an address of the IP-SM-GW for the receiver UE, the HSS allocates an address of the IP-SM-GW for the receiver UE according to identity information (SIP URI or IMSI) of the receiver UE.

Step S53: The S-CSCF sends, to the IP-SM-GW for storage, the short message request failing to be sent. In this embodiment, when it is determined that the IP-SM-GW receives the short message request failing to be sent, the IP-SM-GW stores the short message request and returns confirmation information to the S-CSCF.

The request may carry indication information, to indicate the IP-SM-GW that the request is the short message request failing to be sent, and instruct the IP-SM-GW to store the request. The indication information may be implemented in the following manners: adding a failing SMS field to a Content-Disposition header, indicating that the requested message body is a failed short message, does not need to be sent and is saved only, which means that the request corresponding to the short message is saved; or, adding a save SMS request field to a Subject header, indicating that an objective of the request message is to save the request.

Step S54: When it is learnt that the receiver UE changes to available status, trigger the IP-SM-GW to resend the short message request to the receiver UE. In this embodiment, it may be implemented in three different manners.

Figure 5B:
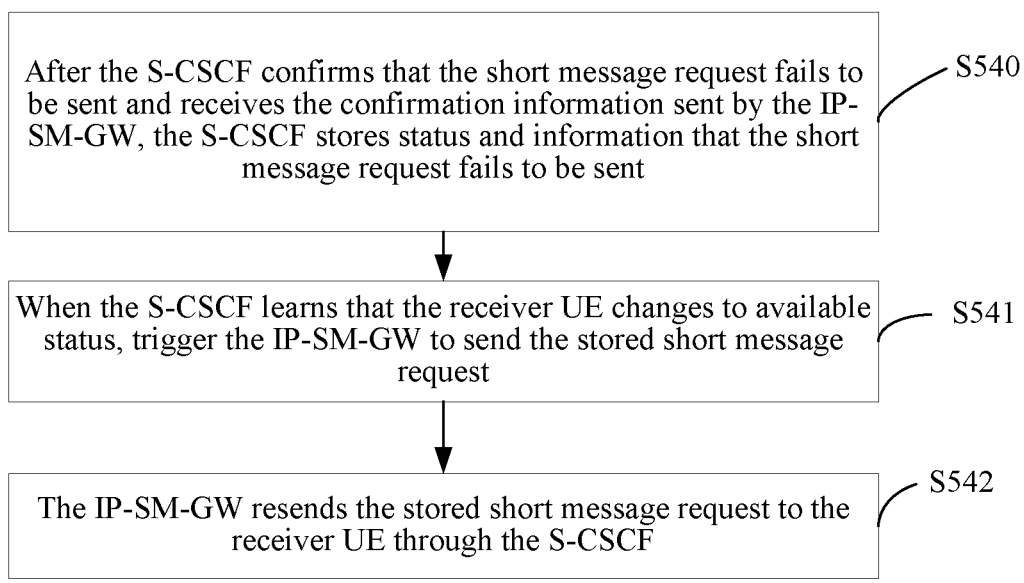
FIG. 5B is a first flowchart of step S54 in the method for implementing resending of a short message in FIG. 5A.

As shown in FIG. 5B, a first situation includes the following.

Step S540: After the S-CSCF confirms that the short message request fails to be sent and receives the confirmation information sent by the IP-SM-GW, the S-CSCF stores status and information that the short message request fails to be sent. In this embodiment, the information may include identity information of the receiver UE, the address of the IP-SM-GW storing the short message request and a reason why the short message request fails to be sent.

Step S541: When the S-CSCF learns that the receiver UE changes to available status, for example, after the UE is switched on and performs IMS registration, or when the memory of the UE is available, or when the UE changes to support the SIP short message from not supporting the SIP short message, or when the UE is reachable again, trigger the IP-SM-GW to send the stored short message request.

Step S542: The IP-SM-GW resends the stored short message request to the receiver UE through the S-CSCF.

Figure 5C:
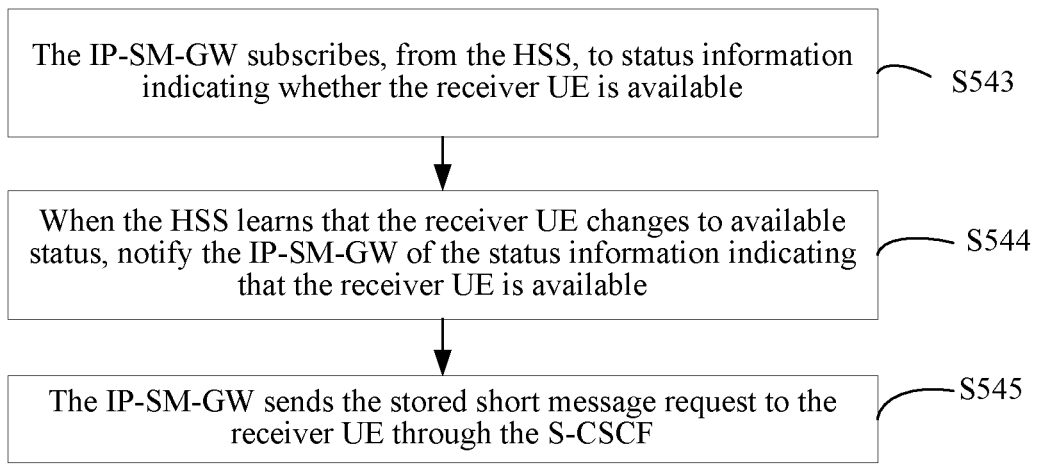
FIG. 5C is a second flowchart of step S54 in the method for implementing resending of a short message in FIG. 5A.

As shown in FIG. 5C, a second situation includes the following.

Step S543: The IP-SM-GW subscribes, from the HSS, to status information indicating whether the receiver UE is available.

Step S544: When the HSS learns that the receiver UE changes to available status, for example, after the UE is switched on and performs IMS registration, or when the memory of the UE is available, or when the UE changes to support the SIP short message from not supporting the SIP short message, or when the UE is reachable again, notify the IP-SM-GW of this available status information.

Step S545: The IP-SM-GW sends the stored short message request to the receiver UE through the S-CSCF.

Figure 5D:
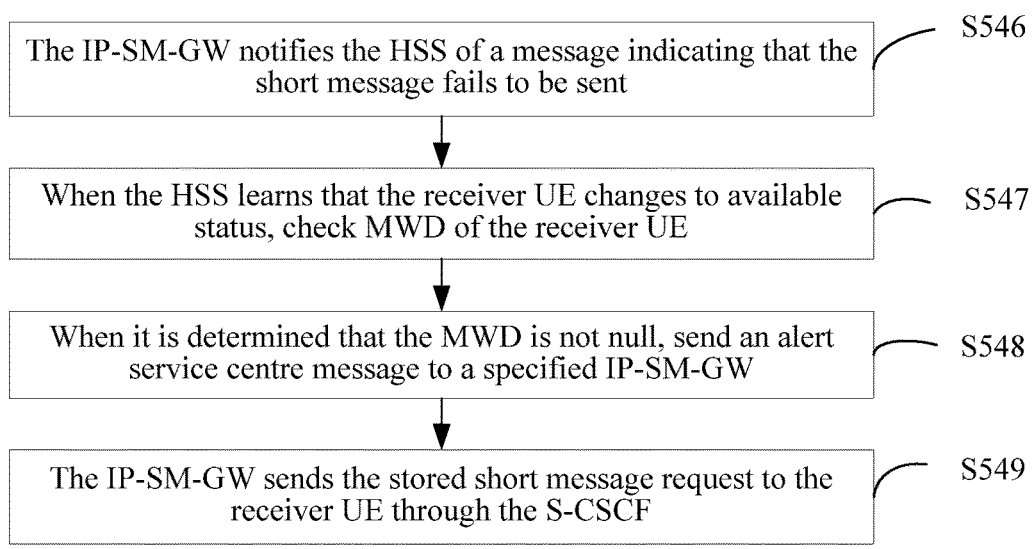
FIG. 5D is a third flowchart of step S54 in the method for implementing resending of a short message in FIG. 5A.

As shown in FIG. 5D, a third situation includes the following.

Step S546: The IP-SM-GW notifies the HSS of a message indicating that the short message fails to be sent. In this case, the HSS adds the following records to MWD corresponding to the short message, where the records include identity information of the receiver UE, the address of the IP-SM-GW storing the short message request and a reason why the short message request fails to be sent.

Step S547: When the HSS learns that the receiver UE changes to available status, for example, after the UE is switched on and performs IMS registration, or when the memory of the UE is available, or when the UE changes to support the SIP short message from not supporting the SIP short message, or when the UE is reachable again, check the MWD of the receiver UE.

Step S548: When it is determined that the MWD is not null, send an alert service centre message to a specified IP-SM-GW.

Step S549: The IP-SM-GW sends the stored short message request to the receiver UE through the S-CSCF.

In the embodiment of the present disclosure, in the IMS domain, when the short message request fails to be sent to the receiver because the receiver is unavailable, the IP-SM-GW performs storage processing on the short message request, and when the receiver changes to available status, resends the short message request to the receiver, so as to implement resending of the short message request failing to be sent, thereby improving availability of sending the short message request in the IMS and improving user experience.

Figure 6A:
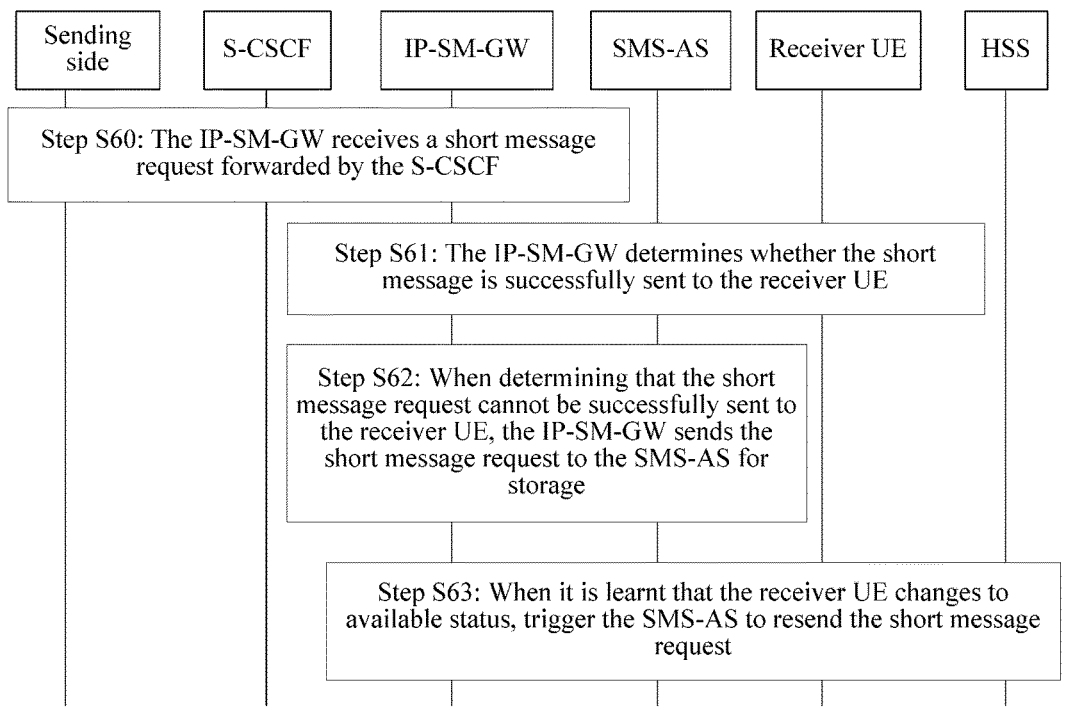
FIG. 6A is a flowchart of a method for implementing resending of a short message according to a fifth embodiment of the present disclosure.

FIG. 6A is a flowchart of a method for implementing resending of a short message according to a fifth embodiment of the present disclosure.

In this embodiment, a short message request for sending a short message passes through an IP-SM-GW. When the short message fails to be sent, the IP-SM-GW processes the case of sending failure. When in a sending process, the short message cannot be sent to the receiver due to abnormity of the receiver, the short message request may be stored in an SMS-AS. After the abnormity of the receiver is eliminated, the SMS-AS is triggered to resend the short message.

Step S60: An IP-SM-GW receives a short message request forwarded by an S-CSCF. In this embodiment, the short message request includes information such as content of a short message and information of a receiver UE. Definitely, the short message request may also include indication information, where the indication information is used for indicating that the short message request is stored locally if the short message request fails to be sent. A network entity stores, according to the indication and in the SMS-AS of the receiver, the short message request failing to be sent.

Step S61: The IP-SM-GW determines whether the short message is successfully sent to the receiver UE. In this embodiment, the IP-SM-GW may determine, according to a received response message, whether the short message is successfully sent to the receiver UE. In this embodiment, when the receiver UE is unreachable, or the memory of the receiver UE is full, or the receiver UE does not support a SIP message type, the receiver UE returns a response message of a failure or a response message of a short message failure report to the IP-SM-GW. Therefore, the IP-SM-GW can determine, through the returned response message, that the short message is not successfully sent to the receiver UE, and it may be considered that the short message fails to be sent.

Step S62: When it is determined that the short message request cannot be successfully sent to the receiver UE, the IP-SM-GW sends the short message request to the SMS-AS for storage. In this embodiment, after storing the short message request, the SMS-AS returns a confirmation message to the IP-SM-GW.

Step S63: When it is learnt that the receiver UE changes to available status, trigger the SMS-AS to resend the short message request. In this embodiment, it may be implemented in three different manners.

Figure 6B:
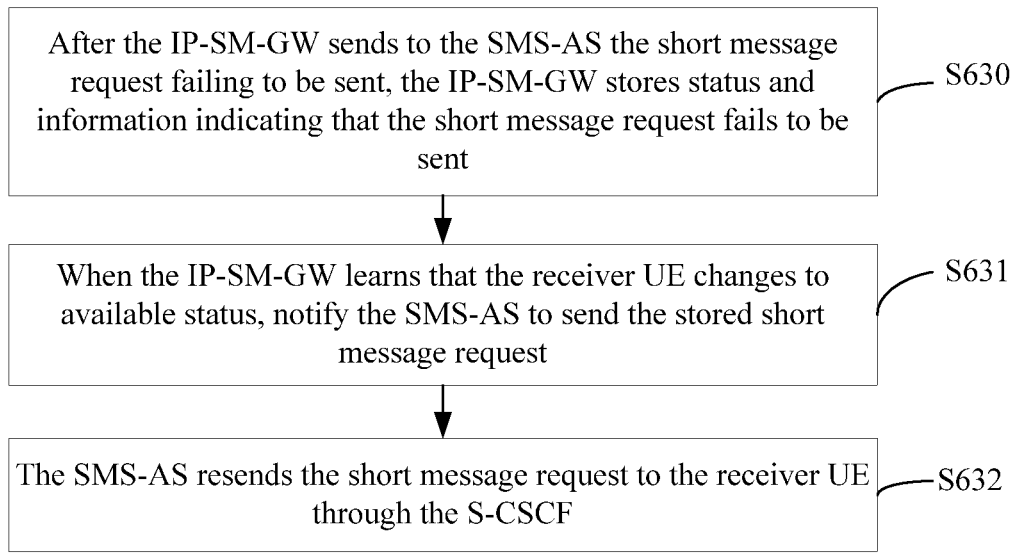
FIG. 6B is a first flowchart of step S63 in the method for implementing resending of a short message in FIG. 6A.

As shown in FIG. 6B, a first situation includes the following.

Step S630: After the IP-SM-GW sends to the SMS-AS the short message request failing to be sent, the IP-SM-GW stores status and information indicating that the short message request fails to be sent. In this embodiment, the information may include identity information of the receiver UE, the address of the SMS-AS storing the short message request and a reason why the short message request fails to be sent.

Step S631: When the IP-SM-GW learns that the receiver UE changes to available status, for example, after the UE is switched on and performs IMS registration, or when the memory of the UE is available, or when the UE changes to support the SIP short message from not supporting the SIP short message, or when the UE is reachable again, notify the SMS-AS to send the stored short message request.

Step S632: The SMS-AS resends the short message request to the receiver UE through the S-CSCF.

Figure 6C:
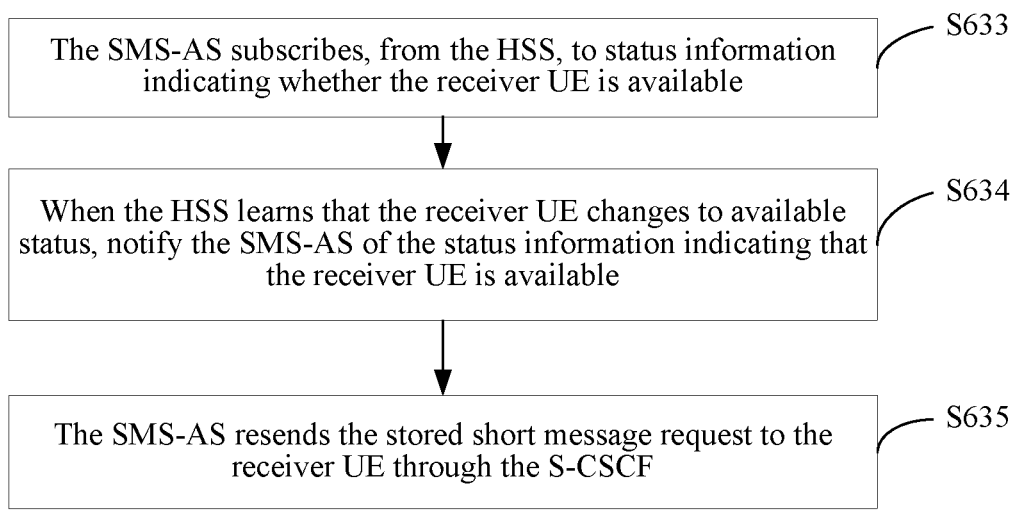
FIG. 6C is a second flowchart of step S63 in the method for implementing resending of a short message in FIG. 6A.

As shown in FIG. 6C, a second situation includes the following.

Step S633: The SMS-AS subscribes, from an HSS, to status information indicating whether the receiver UE is available.

Step S634: When the HSS learns that the receiver UE changes to available status, for example, after the UE is switched on and performs IMS registration, or when the memory of the UE is available, or when the UE changes to support the SIP short message from not supporting the SIP short message, or when the UE is available again, notify the SMS-AS of this available status information.

Step S635: The SMS-AS resends the stored short message request to the receiver UE through the S-CSCF.

Figure 6D:
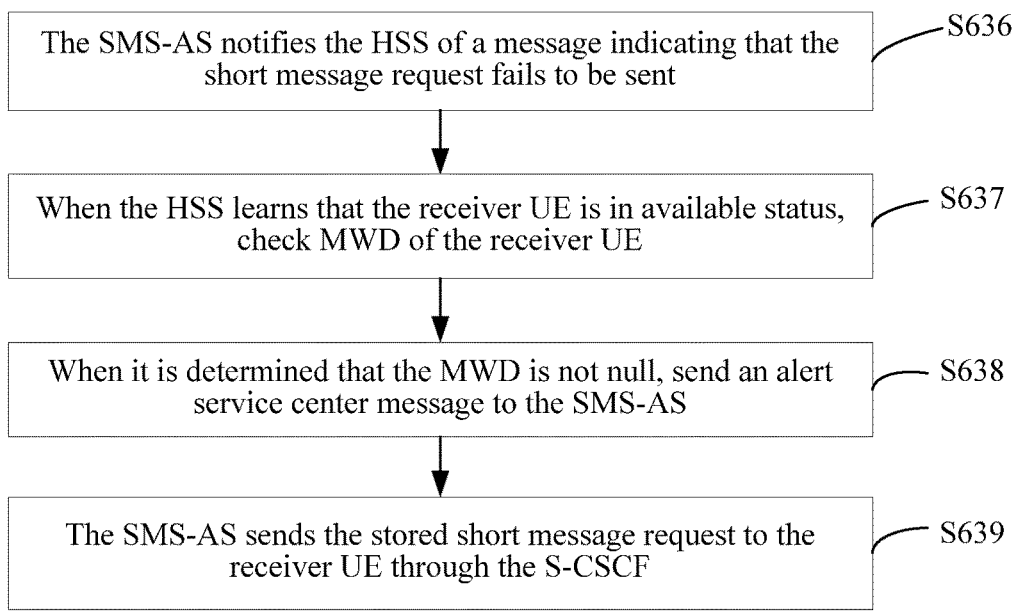
FIG. 6D is a third flowchart of step S63 in the method for implementing resending of a short message in FIG. 6A.

As shown in FIG. 6D, a third situation includes the following.

Step S636: The SMS-AS notifies the HSS of a message indicating that the short message request fails to be sent. In this case, the HSS records MWD corresponding to the short message, where the MWD includes identity information of the receiver UE, the address of the SMS-AS storing the short message request, and a reason why the short message request fails to be sent.

Step S637: When the HSS learns that the receiver UE is in available status, for example, after the UE is switched on and performs IMS registration, or when the memory of the UE is available, or when the UE changes to support the SIP short message from not supporting the SIP short message, or when the UE is reachable again, check the MWD of the receiver UE.

Step S638: When it is determined that the MWD is not null, send an alert message of alert service center to the SMS-AS.

Step S639: The SMS-AS sends the stored short message request to the receiver UE through the S-CSCF.

In the embodiment of the present disclosure, in the IMS domain, when the short message request fails to be sent to the receiver because the receiver is unavailable, the IP-SM-GW sends the short message request to the SMS-AS for storage processing, and when the receiver changes to the available status, resends the short message request to the receiver, so as to implement resending of the short message request failing to be sent, thereby improving availability of sending the short message request in the IMS and improving user experience.

Figure 7A:
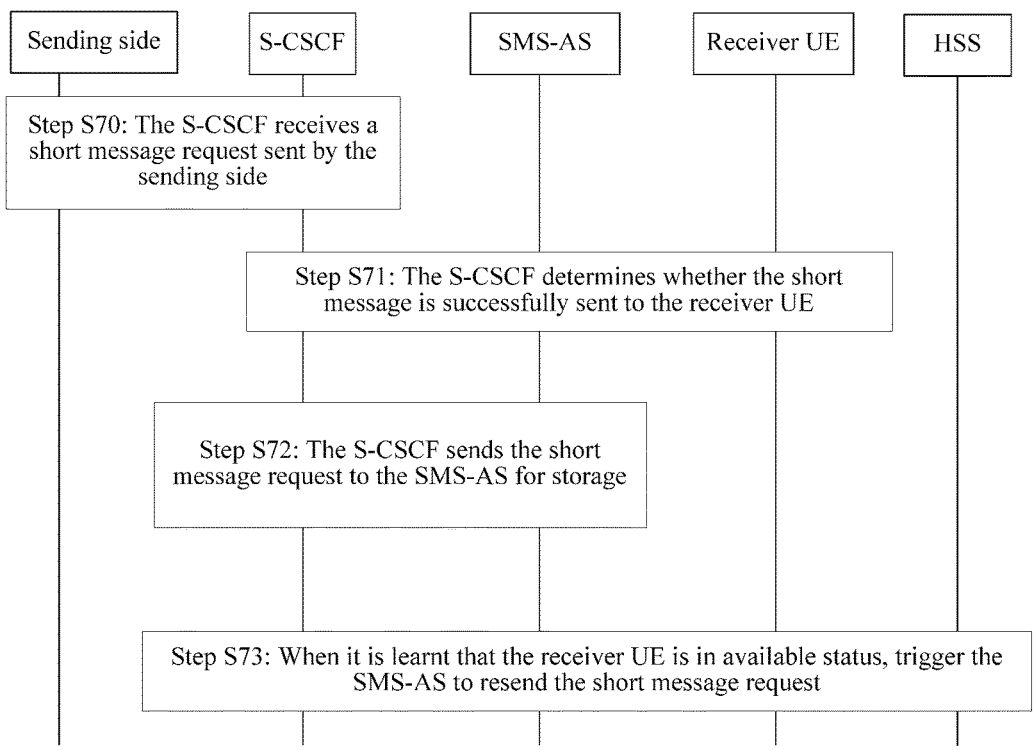
FIG. 7A is a flowchart of a method for implementing resending of a short message according to a sixth embodiment of the present disclosure.

FIG. 7A is a flowchart of a method for implementing resending of a short message according to a sixth embodiment of the present disclosure.

In this embodiment, a short message request for sending a short message does not pass through an IP-SM-GW. An S-CSCF processes a situation in which the short message fails to be sent. When in a sending process, the short message cannot be sent to a receiver due to abnormality of the receiver, the short message request may be stored in an SMS-AS. After the abnormality of the receiver is eliminated, the SMS-AS is triggered to resend the short message.

Step S70: An S-CSCF receives a short message request sent by a sending side. In this embodiment, the short message request includes content of a short message and information of a receiver UE. The short message request is a SIP request message. Definitely, the short message request may also include indication information carried by a sender, where the indication information is used for indicating that the short message request is stored locally if the short message request fails to be sent. A network entity stores, according to the indication and in an SMS-AS of the receiver, the short message request failing to be sent.

Step S71: An S-CSCF determines whether the short message is successfully sent to a receiver UE. In this embodiment, the S-CSCF may determine, according to registration information of the receiver UE saved by the S-CSCF or a received response message, whether the short message is successfully sent to the receiver UE. In this embodiment, if the receiver UE is switched off, the registration information of the receiver UE saved by the S-CSCF is off-line or off-net information, that is, the S-CSCF can determine, according to the registration information of the receiver UE saved by the S-CSCF, whether the receiver UE is switched off. If it is determined that the receiver UE is in off status, the short message cannot be successfully sent to the receiver UE; or when the memory of the receiver UE is full or the receiver UE does not support a SIP message type, the receiver UE returns a response message of a failure or a response message of a short message failure report to the S-CSCF. Therefore, the S-CSCF can determine, through the returned response message, that the short message is not successfully sent to the receiver UE, and it may be considered that the short message fails to be sent.

Step S72: The S-CSCF sends the short message request to the SMS-AS for storage. In this embodiment, after storing the short message request failing to be sent, an SMS-AS returns confirmation information to the S-CSCF.

Step S73: When it is learnt that the receiver UE is in available status, trigger the SMS-AS to resend the short message request. In this embodiment, it may be implemented in three different manners.

Figure 7B:
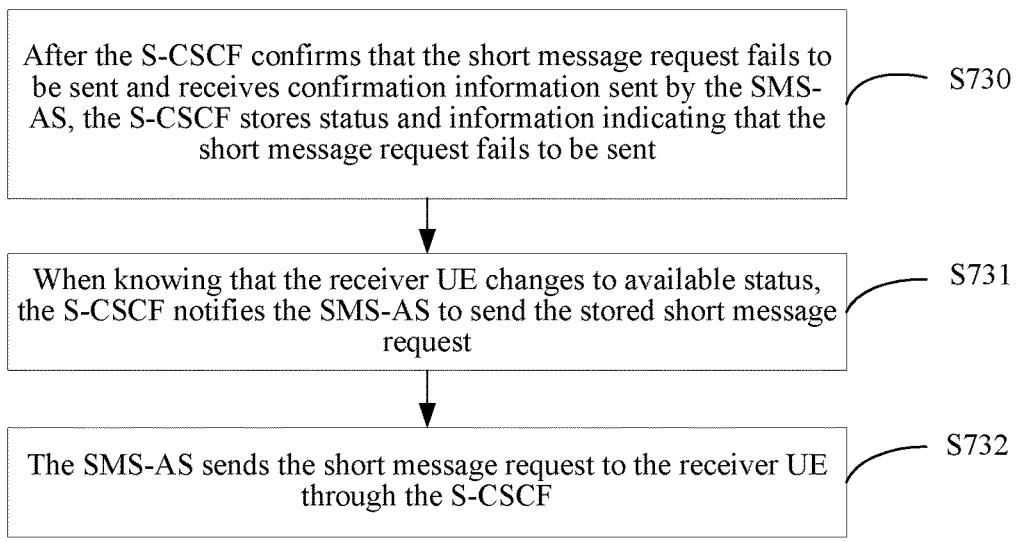
FIG. 7B is a first flowchart of step S73 in the method for implementing resending of a short message in FIG. 7A.

As shown in FIG. 7B, a first situation includes the following.

Step S730: After the S-CSCF confirms that the short message request fails to be sent and receives the confirmation information sent by the SMS-AS, the S-CSCF stores status and information indicating that the short message request fails to be sent. In this embodiment, the information may include identity information of the receiver UE, the address of the SMS-AS storing the short message request, and a reason why the short message request fails to be sent.

Step S731: When the S-CSCF learns that the receiver UE changes to available status, for example, after the UE is switched on and performs IMS registration, or when the memory of the UE is available, or when the UE changes to support the SIP short message from not supporting the SIP short message, or when the UE is reachable again, notify the SMS-AS to send the stored short message request.

Step S732: The SMS-AS sends the short message request to the receiver UE through the S-CSCF.

Figure 7C:
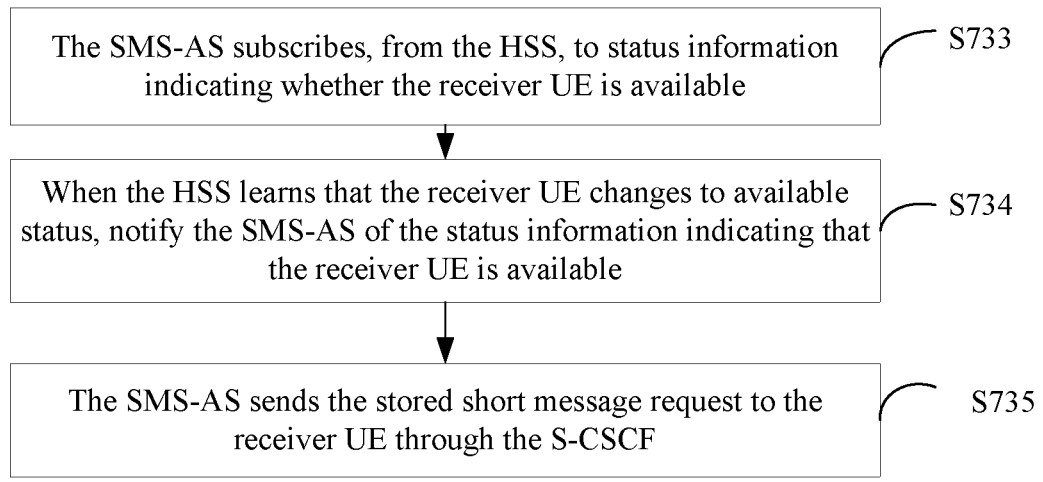
FIG. 7C is a second flowchart of step S73 in the method for implementing resending of a short message in FIG. 7A.

As shown in FIG. 7C, a second situation includes the following.

Step S733: The SMS-AS subscribes, from an HSS, to status information indicating whether the receiver UE is available.

Step S734: When the HSS learns that the receiver UE changes to available status, for example, after the UE is switched on and performs IMS registration, or when the memory of the UE is available, or when the UE changes to support the SIP short message from not supporting the SIP short message, or when the UE is reachable again, notify the SMS-AS of the status information indicating that the receiver UE is available.

Step S735: The SMS-AS sends the stored short message request to the receiver UE through the S-CSCF.

Figure 7D:
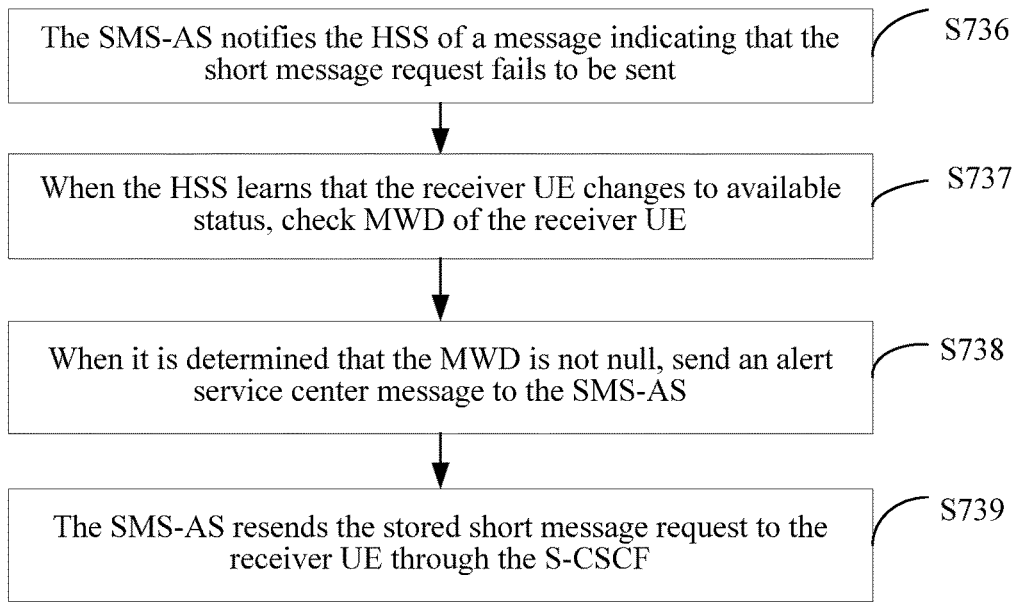
FIG. 7D is a third flowchart of step S73 in the method for implementing resending of a short message in FIG. 7A.

As shown in FIG. 7D, a third situation includes the following.

Step S736: The SMS-AS notifies the HSS of a message indicating that the short message request fails to be sent. In this case, the HSS records MWD corresponding to the short message, where the MWD includes identity information of the receiver UE, the address of the SMS-AS storing the short message request, and the reason why the short message request fails to be sent.

Step S737: When the HSS learns that the receiver UE changes to available status, for example, after the UE is switched on and performs IMS registration, or when the memory of the UE is available, or when the UE changes to support the SIP short message from not supporting the SIP short message, or when the UE is reachable again, check the MWD of the receiver UE.

Step S738: When it is determined that the MWD is not null, send an alert message of alert service center to the SMS-AS.

Step S739: The SMS-AS resends the stored short message request to the receiver UE through the S-CSCF.

In the embodiment of the present disclosure, in the IMS domain, when the short message request fails to be sent to the receiver because the receiver is unavailable, the S-CSCF sends the short message request to the SMS-AS for storage processing, and when the receiver changes to the available status, resends the short message request to the receiver, so as to implement resending of the short message request failing to be sent, thereby improving availability of sending the short message request in the IMS and improving user experience.

Figure 8:
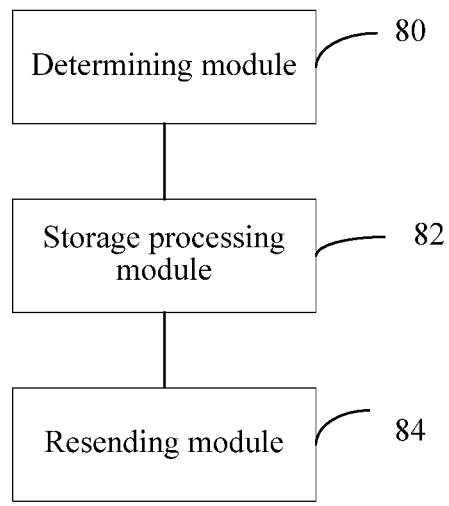
FIG. 8 is a structural diagram of an apparatus for implementing resending of a short message according to a seventh embodiment of the present disclosure.

FIG. 8 is a structural diagram of an apparatus for implementing resending of a short message according to a seventh embodiment of the present disclosure.

In this embodiment, the apparatus may include a determining module 80, a storage processing module 82 and a resending module 84.

In this embodiment, the determining module 80 is configured to determine whether in an IMS domain, a short message request fails to be sent to a receiver.

The storage processing module 82 is configured to, when the determining module 80 determines that the short message request fails to be sent, perform storage processing on the short message request. In this embodiment, in the IMS domain, when in a sending process, the short message cannot be sent to the receiver due to abnormity of the receiver, the storage processing module 82 may send the short message corresponding to the short message request to an SC in a network of the receiver for storage, and may also send the short message to an SC to which a sender corresponding to the short message belongs for storage. The storage processing module 82 may also store the short message request in an IP-SM-GW, or store the short message request in an SMS-AS. The foregoing manners are not unique implementation manners, but are optional.

The resending module 84 is configured to, when it is learnt that the receiver corresponding to the short message request changes to available status, resend the short message request, which has undergone storage processing, to the receiver through the IMS domain.

The apparatus according to the embodiment of the present disclosure may be embedded in the IP-SM-GW or an S-CSCF.

In the apparatus according to the embodiment of the present disclosure, in the IMS domain, when the short message request fails to be sent to the receiver because the receiver is unavailable, storage processing is performed on the short message request, and when the receiver changes to the available status, the short message request is resent to the receiver, so as to implement resending of the short message request failing to be sent, thereby improving availability of sending the short message request in the IMS and improving user experience.

The following gives detailed description.

Figure 9:
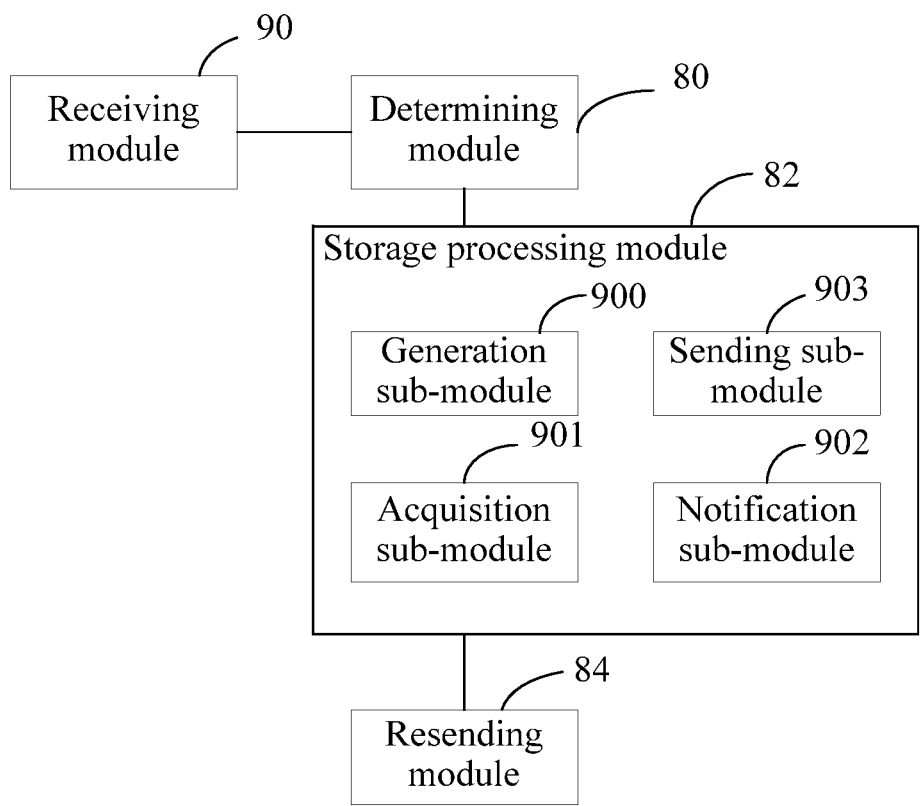
FIG. 9 is a structural diagram of an apparatus for implementing resending of a short message according to an eighth embodiment of the present disclosure.

FIG. 9 is a structural diagram of an apparatus for implementing resending of a short message according to a eighth embodiment of the present disclosure. In this embodiment, the apparatus shown in FIG. 8 is embedded in the IP-SM-GW.

In this embodiment, the apparatus further includes a receiving module 90 configured to receive a short message request which is sent by a sending side and is forwarded by the S-CSCF. The determining module 80 is configured to determine whether the short message received by the receiving module 90 is successfully sent to a receiver UE.

The storage processing module 82 is configured to, when the determining module 80 determines that the short message request fails to be sent, send the short message corresponding to the short message request to the SC for storage. It may also be understood that, when the determining module 80 learns that the short message fails to be sent to the receiver in the IMS domain, the storage processing module 82 sends the short message to a service center, so that the service center stores the short message.

The storage processing module 82 is further configured to generate a correlation identifier or an SMSCN, save the correlation identifier and a SIP URI-form identity of the receiver of the short message failing to be sent, or save the correlation identifier and SIP URI-form identities of a sender and the receiver of the short message failing to be sent.

The storage processing module 82 is further configured to enable the IP-SM-GW to acquire an address of the service center, and send the short message to the service center according to the acquired address, so that the service center stores the short message, where the short message includes the correlation identifier, or includes the SMSCN and an address of the IP-SM-GW.

In this embodiment, the storage processing module 82 may include a generation sub-module 900, an acquisition sub-module 901, a notification sub-module 902 and a sending sub-module 903.

In this embodiment, the generation sub-module 900 is configured to enable the IP-SM-GW to generate an MT Correlation ID or an SMSCN. The acquisition sub-module 901 is configured to acquire the address of the SC. In this embodiment, the acquisition sub-module 901 may acquire an address of an SC to which the receiver of the short message belongs, and may also acquire an address of an SC to which the sender of the short message belongs. The notification sub-module 902 is configured to notify an HSS of information indicating that the short message fails to be sent. The acquisition sub-module 901 is further configured to acquire the short message according to the short message request. The sending sub-module 903 is configured to send, according to the acquired address of the SC, the acquired short message to the SC for storage.

The resending module 84 is configured to, when the receiver corresponding to the short message changes to the available status, receive the stored short message sent by the service center, and send the short message to the receiver through the IMS domain.

In this embodiment, when the receiver corresponding to the short message request changes to the available status, the resending module 84 further generates a short message request according to the short message sent by the SC, and sends the short message to the receiver UE through the S-CSCF. In this embodiment, the resending module 84 is configured to receive the stored short message sent by the service center, generate an IMS-domain SIP message using SIP URI-form identity information corresponding to the correlation identifier or the SMSCN, and send the generated message to the receiver, where the IMS-domain SIP message includes the received short message.

In this embodiment, after receiving the short message request sent by the sending side, the S-CSCF sends the short message request to the receiver UE. When the S-CSCF fails to send the short message request, the S-CSCF sends a failure notification message to the IP-SM-GW. The receiving module 90 may also receive the failure notification message sent by the S-CSCF. The determining module 80 may also confirm, according to the failure notification, that the short message request fails to be sent to the receiver UE. In this case, the storage processing module 82 sends the short message corresponding to the short message request to the SC for storage.

In the embodiment of the present disclosure, in the IMS domain, when the short message request fails to be sent to the receiver because the receiver is unavailable, the IP-SM-GW sends the short message corresponding to the short message request to the SC for storage processing, and when the receiver changes to the available status, resends the short message request to the receiver, so as to implement resending of the short message request failing to be sent, thereby improving availability of sending the short message request in the IMS and improving user experience.

Figure 10:
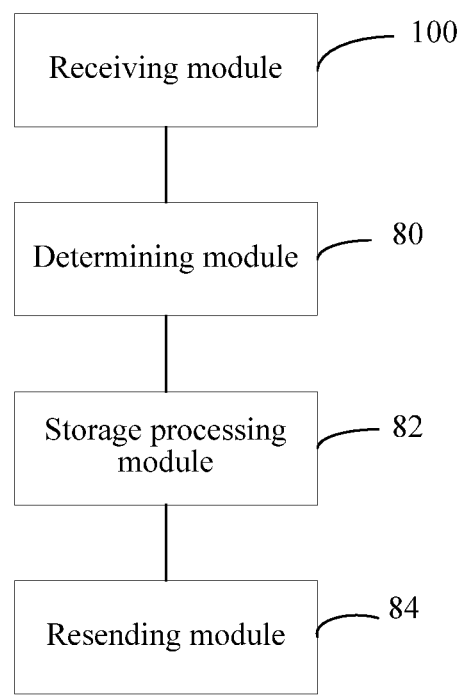
FIG. 10 is a structural diagram of an apparatus for implementing resending of a short message according to a ninth embodiment of the present disclosure.

FIG. 10 is a structural diagram of an apparatus for implementing resending of a short message according to a ninth embodiment of the present disclosure. In this embodiment, the apparatus shown in FIG. 8 is embedded in the IP-SM-GW.

In this embodiment, the apparatus further includes a receiving module 100 configured to receive a short message request which is sent by a sending side and is forwarded by the S-CSCF. The determining module 80 is configured to determine whether the short message received by the receiving module 100 is successfully sent to a receiver UE.

The storage processing module 82 is configured to, when the determining module 80 determines that the short message request fails to be sent, store the short message request. In this embodiment, it may also be understood that, when the determining module 80 learns that in the IMS domain, the short message fails to be sent to the receiver, the storage processing module 82 stores the short message request corresponding to the short message failing to be sent.

In this embodiment, when the receiver corresponding to the short message changes to the available status, the resending module 84 may resend the stored short message to the receiver through the IMS domain.

The resending module 84 is configured to, when the determining module 80 determines that the receiver corresponding to the short message request changes to the available status, send the short message request stored by the storage processing module 82 to the receiver UE through the S-CSCF.

In this embodiment, the receiving module 100 is further configured to receive information that is sent by the S-CSCF and indicates that the receiver is available, or receive a notification message that is sent by the HSS and indicates that the receiver is available. The determining module 80 is further configured to, when the receiving module 100 receives the information that is sent by the S-CSCF and indicates that the receiver is available, or receives the notification message that is sent by the HSS and indicates that the receiver is available, determine that the receiver corresponding to the short message request changes to the available status.

In this embodiment, after receiving the short message request sent by the sending side, the S-CSCF sends the short message request to the receiver UE. When the S-CSCF fails to send the short message request, the S-CSCF sends a failure notification message to the IP-SM-GW. The receiving module 100 may also receive the failure notification message sent by the S-CSCF. The determining module 80 may also confirm, according to the failure notification, that the short message request fails to be sent to the receiver UE. In this case, the storage processing module 82 stores the short message request. At the same time, when the S-CSCF determines that the receiver corresponding to the short message request changes to the available status, the S-CSCF notifies the resending module 84 to send the stored short message request to the S-CSCF, and then sends the short message request to the receiver UE.

In the embodiment of the present disclosure, in the IMS domain, when the short message request fails to be sent to the receiver because the receiver is unavailable, the IP-SM-GW performs storage processing on the short message request, and when the receiver changes to the available status, resends the short message request to the receiver, so as to implement resending of the short message request failing to be sent, thereby improving availability of sending the short message request in the IMS and improving user experience.

Figure 11:
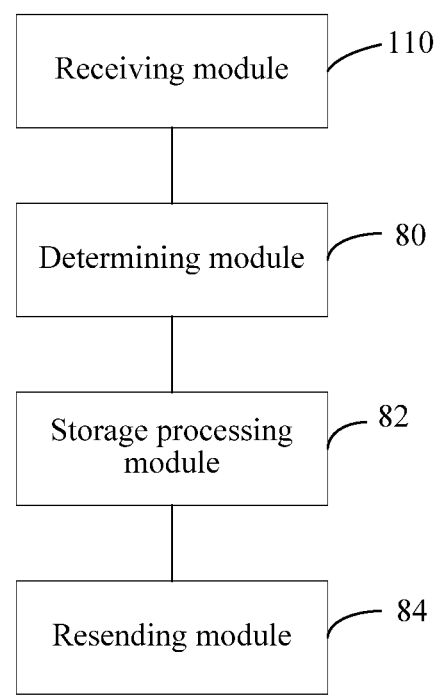
FIG. 11 is a structural diagram of an apparatus for implementing resending of a short message according to a ninth embodiment of the present disclosure.

FIG. 11 is a structural diagram of an apparatus for implementing resending of a short message according to a ninth embodiment of the present disclosure. In this embodiment, the apparatus shown in FIG. 8 is embedded in the IP-SM-GW.

In this embodiment, the apparatus further includes a receiving module 110 configured to receive a short message request which is sent by a sending side and is forwarded by the S-CSCF. The determining module 80 is configured to determine whether the short message received by the receiving module 110 is successfully sent to a receiver UE.

The storage processing module 82 is configured to, when the determining module 80 determines that the short message request fails to be sent, send the short message request to an SMS-AS for storage.

The resending module 84 is configured to, when the receiver corresponding to the short message request changes to the available status, trigger the SMS-AS to resend the short message request.

In the embodiment of the present disclosure, in the IMS domain, when the short message request fails to be sent to the receiver because the receiver is unavailable, the IP-SM-GW sends the short message request to the SMS-AS for storage processing, and when the receiver changes to the available status, resends the short message request to the receiver, so as to implement resending of the short message request failing to be sent, thereby improving availability of sending the short message request in the IMS and improving user experience.

Figure 12:
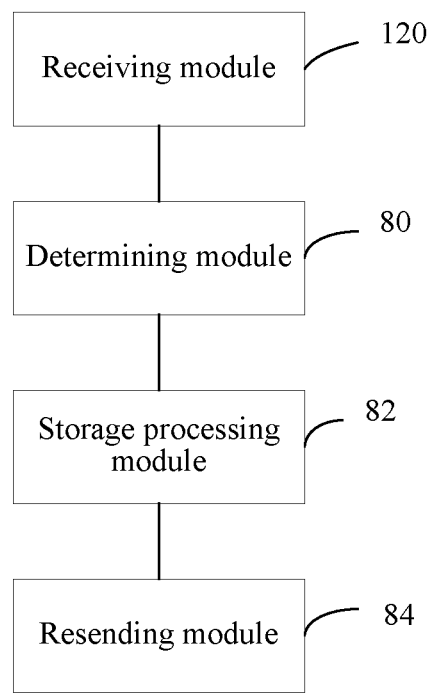
FIG. 12 is a structural diagram of an apparatus for implementing resending of a short message according to a ninth embodiment of the present disclosure.

FIG. 12 is a structural diagram of an apparatus for implementing resending of a short message according to a ninth embodiment of the present disclosure. In this embodiment, the apparatus shown in FIG. 8 is embedded in the S-CSCF.

In this embodiment, the apparatus further includes a receiving module 120 configured to receive a short message request sent by a sending side. The determining module 80 is configured to determine whether the short message received by the receiving module 120 is successfully sent to a receiver UE.

The storage processing module 82 is configured to, when the determining module 80 determines that the short message request fails to be sent, send the short message request to an SMS-AS for storage.

The resending module 84 is configured to, when the receiver corresponding to the short message request changes to the available status, trigger the SMS-AS to resend the short message request.

In the embodiment of the present disclosure, in the IMS domain, when the short message request fails to be sent to the receiver because the receiver is unavailable, the IP-SM-GW sends the short message request to the SMS-AS for storage processing, and when the receiver changes to the available status, resends the short message request to the receiver, so as to implement resending of the short message request failing to be sent, thereby improving availability of sending the short message request in the IMS and improving user experience.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present disclosure is performed. The storage medium may be a magnetic disk, an optical disk, a read-only memory (ROM), a random access memory (RAM), and the like.

The foregoing descriptions are merely specific embodiments of the present disclosure, but are not intended to limit the protection scope of the present disclosure. Changes or replacements readily apparent to persons skilled in the art within the technical scope of the present disclosure shall fall within the protection scope of the present disclosure. Therefore, the protection scope of the present disclosure is subject to the protection scope of the claims.

What is claimed is:

1. A method for implementing resending of a short message, carried out by an Internet Protocol short message gateway (IP-SM-GW), comprising:
    generating a correlation identifier when the IP-SM-GW learns that in an Internet Protocol Multimedia Subsystem (IMS) domain a short message failed to send to a receiver;
    sending the short message and the correlation identifier to a service center;
    receiving the short message and the correlation identifier from the service center when the receiver corresponding to the short message changes to an available status;
    generating an IMS-domain Session Initiation Protocol (SIP) message according to a Session Initiation Protocol universal resource identifier (SIP URI)-form identity information corresponding to the correlation identifier; and
    sending the IMS-domain SIP message to the receiver through the IMS domain, wherein the IMS-domain SIP message comprises the short message.

2. The method of claim 1, wherein before sending the short message to the service center, the method further comprises:
    generating, by the IP-SM-GW, the correlation identifier; and
    either saving the correlation identifier and a Session Initiation Protocol universal resource identifier (SIP URI)-form identity of the receiver to which the short message failed to be sent, or saving the correlation identifier and SIP URI-form identities of a sender and the receiver to which the short message failed to be sent.

3. The method of claim 1, wherein before sending the short message to the service center, the method further comprises acquiring, by the IP-SM-GW, an address of the service center.

4. The method of claim 3, wherein acquiring, by the IP-SM-GW, the address of the service center further comprises acquiring, by the IP-SM-GW, an address of a service center to which the receiver corresponding to the short message belongs.

5. The method of claim 4, wherein acquiring the address of the service center to which the receiver corresponding to the short message belongs further comprises acquiring, by the IP-SM-GW, the address of the service center to which the receiver corresponding to the short message belongs, by querying an address of a service center to which the receiver belongs, and wherein the address is stored by the IP-SM-GW.

6. The method of claim 3, wherein acquiring the address of the service center further comprises acquiring, by the IP-SM-GW, an address of a service center to which a sender corresponding to the short message belongs.

7. The method of claim 6, wherein acquiring the address of the service center to which the sender corresponding to the short message belongs further comprises acquiring, by the IP-SM-GW, the address of the service center to which the sender corresponding to the short message belongs, by querying an address of a service center carried in the short message request used for sending the short message.

8. The method of claim 2, wherein before sending the short message to the service center, the method further comprises sending, by the IP-SM-GW, a short message transmission status report message to a home subscriber server (HSS), and wherein the short message transmission status report message at least comprises the correlation identifier, an address of the service center, and the identity of the receiver of the short message.

9. The method of claim 3, wherein sending the short message to the service center comprises sending the short message to the service center according to the acquired address of the service center, and wherein the service center stores the short message and the correlation identifier.

10. The method of claim 1, wherein receiving the short message and the correlation identifier from the service center comprises:

sending, by a home subscriber server (HSS), an alert service center message to the service center, wherein the alert service center message carries the correlation identifier; and receiving the short message and the correlation identifier from the service center after an alert service center message is received by the service center from a home subscriber server (HSS), wherein the alert service center message carries the correlation identifier.

11. The method of claim 10, wherein sending the short message associated with the correlation identifier comprises receiving the short message and the correlation identifier from the service center through a short message service gateway mobile switching center (SMS-GMSC) after address information of the IP-SM-GW is acquired by the SMS-GMSC from a home subscriber server (HSS) according to the correlation identifier.

12. An apparatus for implementing resending of a short message, the apparatus comprising:

a memory configured to store processor-executable instructions; and a processor coupled to the memory and configured to execute the processor-executable instructions stored in the memory causing the apparatus to execute the following steps:

generate a correlation identifier when an Internet Protocol short message gateway (IP-SM-GW) learns that in an Internet Protocol multimedia subsystem (IMS) domain a short message failed to send to a receiver;

send the short message and the correlation identifier to a service center;

receive the short message from the service center when the receiver corresponding to the short message changes to an available status;

generate an IMS-domain Session Initiation Protocol (SIP) message according to a Session Initiation Protocol universal resource identifier (SIP URI)-form identity information corresponding to the correlation identifier; and send the IMS-domain SIP message to the receiver through the IMS domain, wherein the IMS-domain SIP message comprises the short message.

13. The apparatus of claim 12, wherein the processor executes the processor-executable instructions stored in the memory causing the apparatus to detect whether the short message failed to send to the receiver in the IMS domain.

14. The apparatus of claim 12, wherein the processor executes the processor-executable instructions stored in the memory causing the app
aratus to:

generate the correlation identifier; and save the correlation identifier and a Session Initiation Protocol universal resource identifier (SIP URI)-form identity of the receiver to which the short message failed to be sent.

15. The apparatus of claim 12, wherein the processor executes the processor-executable instructions stored in the memory causing the apparatus to:

acquire an address of the service center; and send the short message to the service center according to the acquired address and the correlation identifier.

16. The apparatus of claim 12, wherein the processor executes the processor-executable instructions stored in the memory further causing the apparatus to receive the short message and the correlation identifier from the service center after an alert service center message is received by the service center from a home subscriber server (HSS), wherein the alert service center message carries a correlation identifier.

17. The apparatus of claim 12, wherein the processor executes the processor-executable instructions stored in the memory further causing the apparatus to receive the short message and the correlation identifier from the service center through a short message service gateway mobile switching center (SMS-GMSC) after address information of the IP-SM-GW is acquired by the SMS-GMSC from a home subscriber server (HSS) according to the correlation identifier.

18. A non-transitory computer-readable storage medium comprising instructions which, when executed by a computer, cause the computer to carry out the following steps:

generate a correlation identifier when an Internet Protocol short message gateway (IP-SM-GW) learns that in an Internet Protocol Multimedia Subsystem (IMS) domain a short message failed to send to a receiver;

send a short message and the correlation identifier to a service center;

receive the short message from the service center when the receiver corresponding to the short message changes to an available status;

generate an IMS-domain Session Initiation Protocol (SIP) message according to a Session Initiation Protocol universal resource identifier (SIP URI)-form identity information corresponding to the correlation identifier; and send the IMS-domain SIP message to the receiver through the IMS domain.

* * * * *